US007135645B2

(12) United States Patent
Hiraki et al.

(10) Patent No.: US 7,135,645 B2
(45) Date of Patent: Nov. 14, 2006

(54) OCCUPANT WEIGHT DETECTING DEVICE

(75) Inventors: Yasuaki Hiraki, Nisshin (JP); Koji Ito, Aichi-ken (JP); Katsu Hattori, Aichi-ken (JP); Hiroki Satta, Ichinomiya (JP); Yukihiro Yamamoto, Kariya (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 199 days.

(21) Appl. No.: 10/787,755

(22) Filed: Feb. 27, 2004

(65) Prior Publication Data

US 2004/0226756 A1 Nov. 18, 2004

(30) Foreign Application Priority Data

Feb. 27, 2003 (JP) ............................ 2003-050234

(51) Int. Cl.
*G01G 19/34* (2006.01)

(52) U.S. Cl. .................... 177/25.13; 177/144; 701/45; 180/273

(58) Field of Classification Search .................... 177/1, 177/25.13, 13, 136, 144, 210, 208, 209; 701/45; 340/667; 180/273; 280/735; 73/862.53
See application file for complete search history.

(56) References Cited

U.S. PATENT DOCUMENTS 6,345,839 B1 * 2/2002 Kuboki et al. .............. 280/735

FOREIGN PATENT DOCUMENTS

| | | |
|---|---|---|
| JP | 2000-283834 | 10/2000 |
| JP | 2001-004469 | 1/2001 |
| JP | 2001-180354 | 7/2001 |
| JP | 2002-87132 | 3/2002 |
| JP | 2002-160571 | 6/2002 |
| JP | 2003-14564 | 1/2003 |

* cited by examiner

*Primary Examiner*—Kamand Cuneo
*Assistant Examiner*—Sean Kayes
(74) *Attorney, Agent, or Firm*—Buchanan Ingersoll & Rooney PC

(57) ABSTRACT

An occupant weight detecting device includes plural cells provided on a seat and detecting pressure which is defined by rows in a width direction of the seat and columns in a back-and-forth direction of the seat, a peak row detecting means for calculating the sum of pressure per cells of predetermined number of rows adjoining in the back-and-forth direction and detecting any one row of the predetermined number of rows corresponding to the maximum sum to be defined as a peak row, and a detecting means for detecting a concentrated load position on the seat based on the peak row.

8 Claims, 16 Drawing Sheets

F I G. 2
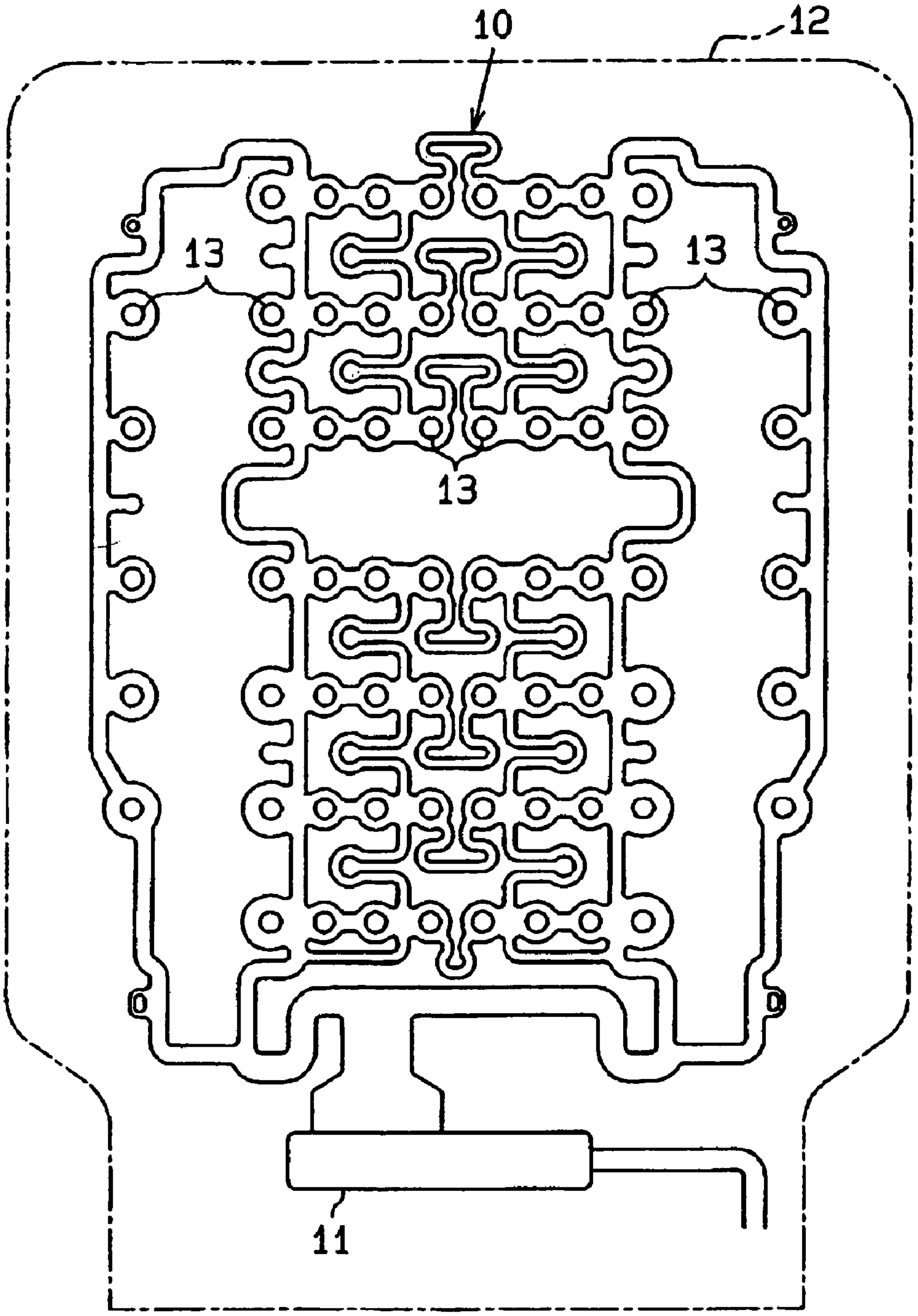

F I G. 15
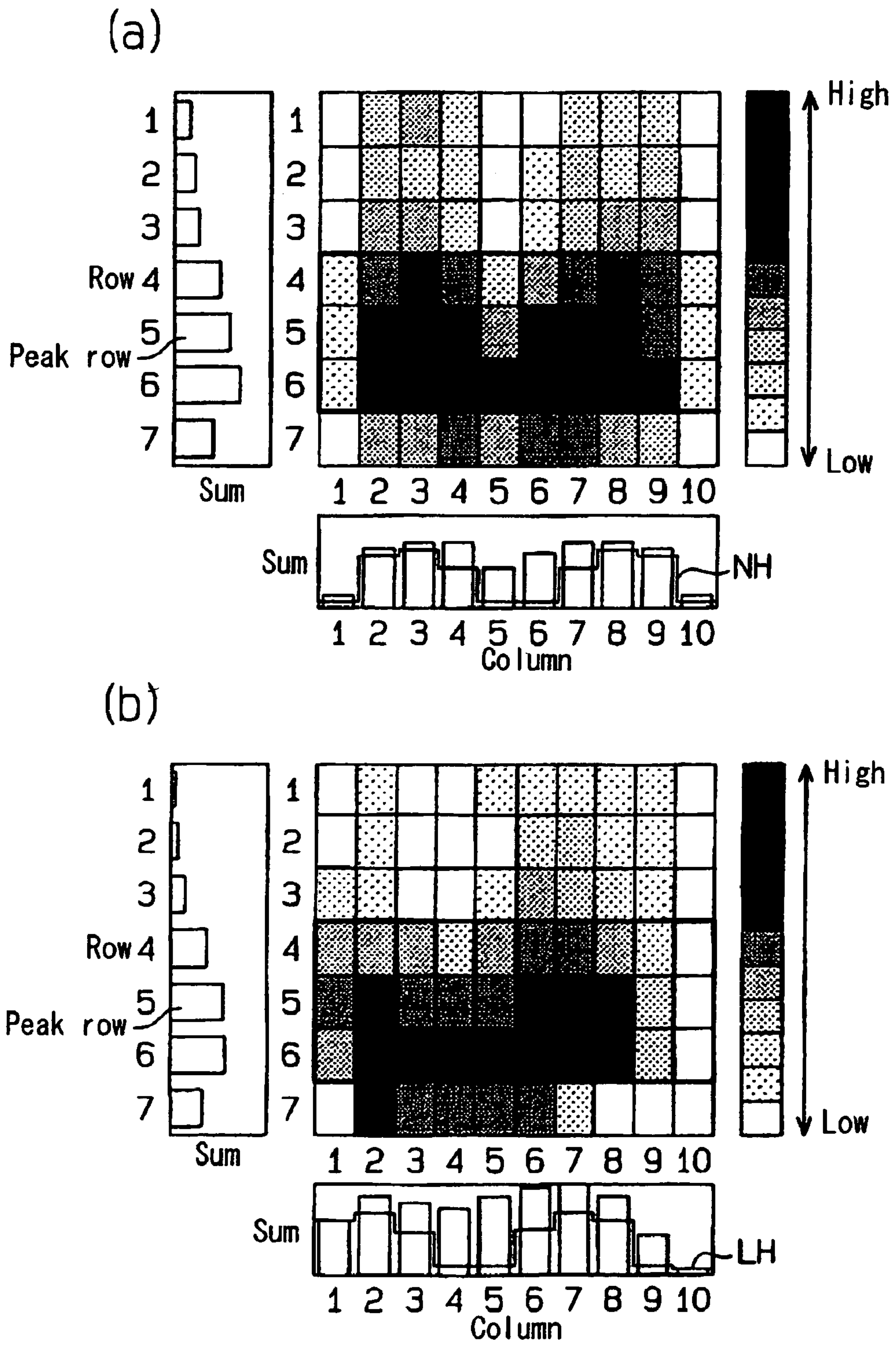

F I G. 17
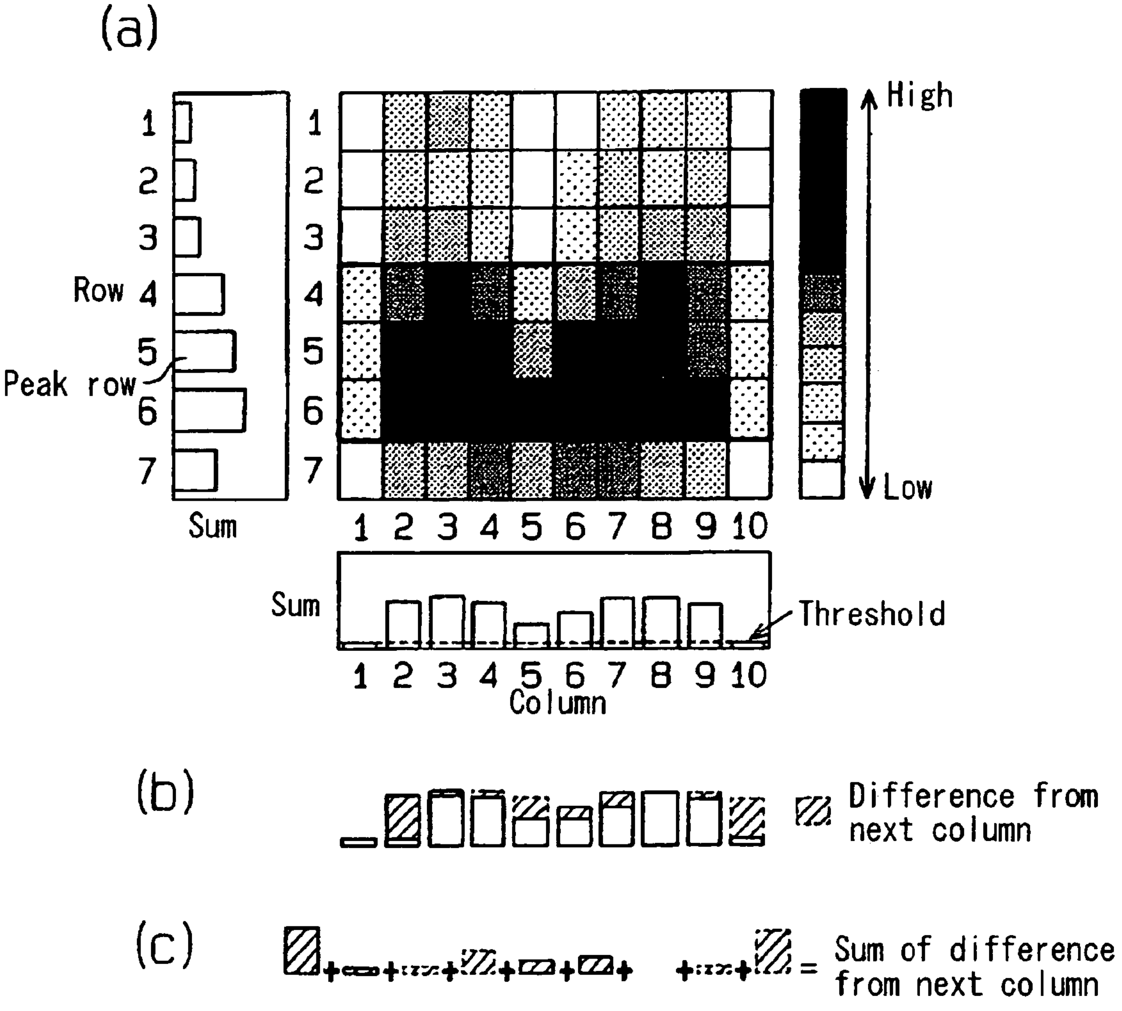

OCCUPANT WEIGHT DETECTING DEVICE

CROSS REFERENCE TO RELATED APPLICATIONS

The application is based on and claims priority under 35 U.S.C. § 119 with respect to a Japanese Patent Application 2003-050234, filed on Feb. 27, 2003, the entire content of which is incorporated herein by reference.

FIELD OF THE INVENTION

This invention generally relates to an occupant weight detecting device. More particularly, this invention pertains to an occupant weight detecting device which has a function whether an occupant sits on a seat or not.

BACKGROUND OF THE INVENTION

Recently, a vehicle has been provided with an air bag device at the front side of the vehicle (e.g. a driver seat, a passenger seat) in order to improve safety of an occupant in case of a collision. When the collision is generated on the vehicle due to a traffic accident, an air bag controller outputs an operating signal for igniting an inflator to an air bag actuator based on a detection signal from a collision detecting sensor, then the air bag device is quickly inflated.

In the above-described vehicles provided with the air bag device operating in case of the collision for the safety of the occupant, there is a vehicle provided with the plural air bag devices and selectively operates the air bag devices in response to a direction of the collision. In this case, the air bag controller has to determine accurately whether the occupant sits on the seat or not in order to operate the air bag device properly. Particularly, with respect to the passenger seat, various situations can be generated, in which an adult sits on the seat, a child sits on the seat, or a child seat (hereinafter referred to as a CRS; Child Restraint System) is mounted on the seat, and the air bag controller needs to determine accurately whether the occupant sits on the seat.

With respect to an occupant weight detecting device for determining whether the occupant sits on the seat or not, various devices are known. For example, a device including plural cells for detecting pressure is known. In this device, the plural cells detects the pressure which is set by rows corresponding to a width direction of the sitting part and columns corresponding to a back-and-forth direction of the sitting part, and the device determines whether the occupant sits on the seat or not based on the pressure detected by the plural cells.

The known occupant weight detecting device including the cells is disclosed in a Japanese Patent Laid-Open Publication No.2001-180354. In this device, the sum of the pressure with respect to the width direction is calculated, and the device determines whether the occupant sits on the seat or not based on a template matching between the sum of the pressure and a predetermined pattern (template). In this device, two templates are provided corresponding to the sum of the pressure in two conditions in which the occupant regularly sits on the seat and the occupant sits on the seat at the front side (hereinafter referred to as a front-side sitting), and the device determines whether the occupant sits on the seat or the CRS is mounted on the seat by comparing two templates with the sum of the pressure detected by the cells.

Further, in the known occupant weight detecting device with the cells disclosed in a Japanese Patent Laid-Open Publication No.2002-87132, a determination value is corrected based on various calculated results, and the device finally determines whether the occupant sits on the seat or the CRS is mounted on the seat based on the corrected determination value. In this device, the device determines whether the occupant sits on the seat or not by a template matching as same with the above-described device.

However, since a build or a sitting manner of the occupant varies from person to person, in the above-described devices using the template matching, the device can perform the occupant determination based on only a limited condition. Further, though the CRS can be distinguished from the occupant based on a basic human-indicator template, the adult cannot be accurately distinguished from the child when the calculated determination value does not match with the basic human-indicator template and the front-side sitting template.

The present invention therefore seeks to provide an occupant weight detecting device capable of improving accuracy of determination about a state on a seat.

SUMMARY OF THE INVENTION

According to an aspect of the present invention, an occupant weight detecting device includes plural cells provided on a seat and detecting pressure which is defined by rows in a width direction of the seat and columns in a back-and-forth direction of the seat, a peak row detecting means for calculating the sum of pressure per cells of predetermined number of rows adjoining in the back-and-forth direction and detecting any one row of the predetermined number of rows corresponding to the maximum sum to be defined as a peak row, and a detecting means for detecting a concentrated load position on the seat based on the peak row.

According to another aspect of the present invention, an occupant weight detecting device includes plural cells provided on a seat and detecting pressure which is defined by rows in a width direction of the seat and columns in a back-and-forth direction of the seat, a peak row detecting means for calculating the sum of pressure per cells of predetermined number of rows adjoining in the back-and-forth direction and detecting any one row of the predetermined number of rows corresponding to the maximum sum to be defined as a peak row, and a deviation determining means for calculating the sum of the cells of predetermined number of columns from one end and the other end with respect to the width direction among the cells of predetermined number of rows including the peak row. The deviation detecting means determines deviation of load with respect to the width direction at the seat based on the calculated sum.

According to still another aspect of the present invention, an occupant weight detecting device includes plural cells provided on a seat and detecting pressure which is defined by rows in a width direction of the seat and columns in a back-and-forth direction of the seat, a minimum column detecting means for detecting a minimum column in both sides with respect to the center of the width direction among the plural cells, in which the sum of pressure is minimum, and a variation calculating means for calculating a first difference between the sum at the minimum column and the sum at a second column adjoined by the minimum column toward the center of the width direction and a second difference between the sum at the second column and the sum at a third column adjoined by the second column toward the center of the width direction with respect to each minimum column detected by the minimum column detecting means. The variation calculating means calculates variation at each side with respect to the width direction by comparing the first difference with the second difference. The occupant weight detecting device further includes a determination means for determining a state on the seat based on the variation at each side calculated by the variation calculating means.

According to still further aspect of the present invention, an occupant weight detecting device includes plural cells provided on a seat and detecting pressure which is defined by rows in a width direction of the seat and columns in a back-and-forth direction of the seat, a peak row detecting means for calculating the sum of pressure per cells of predetermined number of rows adjoining in the back-and-forth direction and detecting any one row of the predetermined number of rows corresponding to the maximum sum to be defined as a peak row, and a peak lateral width counting means for calculating the sum of pressure per each column in the cells of predetermined number of rows including the peak row. The peak lateral width counting means compares the sum at each column with a width threshold being set at each column and counts the number of columns in which the sum is greater than the width threshold to be defined as a peak lateral width. The occupant weight detecting device further includes a determination means for determining a state on the seat based on the peak lateral width counted by the peak lateral width detecting means.

BRIEF DESCRIPTION OF THE DRAWING FIGURES

The foregoing and additional features and characteristics of the present invention will become more apparent from the following detailed description considered with reference to the accompanying drawing figures wherein:

FIG. 2 is a schematic view of a pressure sensor;

FIG. 15 is a graph for explaining "lateral width 2";

FIG. 17 is a graph for explaining "lateral edge".

DETAILED DESCRIPTION OF THE INVENTION

Hereinafter, an embodiment of the present invention is described with reference to attached drawings.

Figure 1:
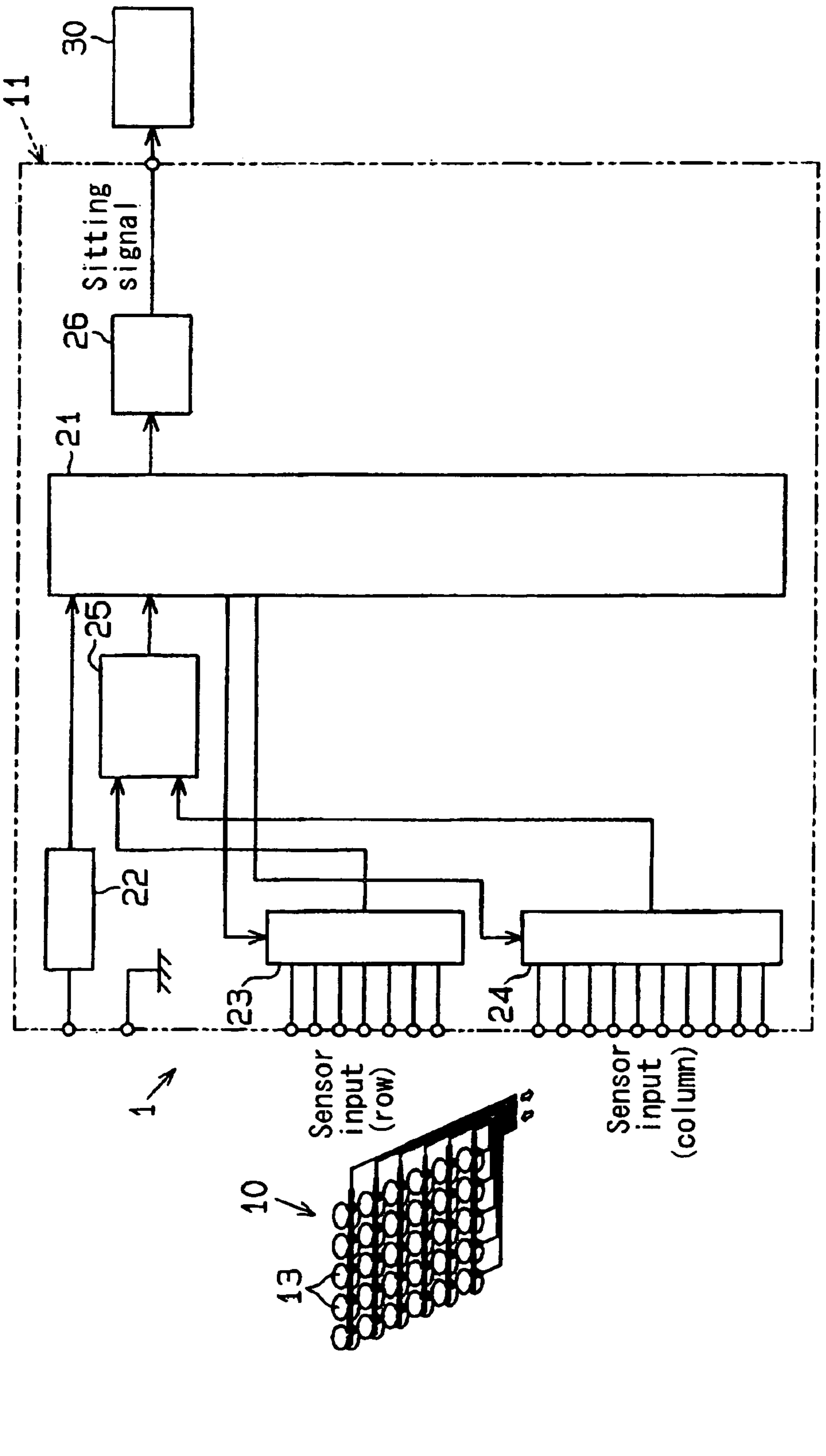
FIG. 1 is a block diagram showing an electrical structure in which an occupant weight detecting device is applied to a vehicle.

FIG. 1 is a block diagram showing an electrical structure in which an occupant weight detecting device is applied to a vehicle, and FIG. 2 is a schematic view of a pressure sensor. As shown in FIG. 1 and FIG. 2, an occupant weight detecting device 1 mainly includes a pressure sensor 10 and a controller 11. The pressure sensor 10 shown in FIG. 2 is accommodated in a sitting part of a vehicle seat (hereinafter referred to as a seat 12). The pressure sensor 10 is provided with known plural cells 13 for detecting pressure (e.g. a cell disclosed in a Japanese Patent Laid-Open Publication No.2001-180354). Each cell 13 is respectively provided at positions defined by rows (the number of rows: i) in a width direction of the sitting part of the seat 12 and columns (the number of columns: j) in a back-and-forth direction of the sitting part of the seat 12. The cells 13 detect partial pressure X(i, j) at each position defined by the rows and the columns, and the detected partial pressure X(i, j) is inputted to the controller 11.

In this embodiment, the partial pressure X(i, j) is detected by sixty six cells 13 provided to be a 7×10 matrix at the sitting part of the seat 12, from which four cells at each corner of the seat 12 are subtracted. This number of cells 13 is one of the examples, and the number of cells is not limited to the number of cells in this embodiment.

The controller 11 includes CPU (central processing unit) 21, a supply circuit 22, a first switching circuit 23, a second switching circuit 24, an A/D conversion circuit 25, and an output circuit 26. The CPU 21 determines a state on the seat 12 according to a control program and initial data memorized in ROM (read-only memory). The supply circuit 22 converts voltage of power source (e.g. 12V) from a battery (not shown) into a predetermined voltage (e.g. 5V) and then supplies the converted power source to the CPU 21.

In this embodiment, the CPU 21 functions as a peak row detecting means, a detecting means, a deviation detecting means, a minimum column detecting means, a variation calculating means, a determination means, a peak lateral width counting means, a difference calculating means, and a lateral edge detecting means.

The first switching circuit 23 and the second switching circuit 24 are connected to the pressure sensor 10 and sequentially inputs the partial pressure X(i, j) detected by each cell 13 to the A/D conversion circuit 25 by selectively switching the rows and columns of the pressure sensor 10 based on a switching signal from the CPU 21. These partial pressure X(i, j) is converted to a digital signal from an analog signal in the A/D conversion circuit 25 and inputted to the CPU 21. The CPU 21 temporarily memorizes the number of cells 13 where the detected partial pressure X(i, j) exceeds a predetermined pressure as "the number of ON-cell" in a memory. The number of ON-cell is used for determining the state on the seat 12.

The output circuit 26 is connected to the CPU 21, and the state on the seat 12 determined by the CPU 21 is inputted to the output circuit 26. The output circuit 26 is connected to an air bag ECU (electronic control unit) 30 and outputs the state on the seat 12 determined by the CPU 21 to the air bag ECU 30 as a sitting signal.

If necessary, the air bag ECU 30 outputs an operating signal for igniting an air bag inflator (not shown) to an air bag actuator (not shown) based on the sitting signal and a signal from a sensor (not shown), then the air bag device (not shown) provided at a passenger seat or a driver seat is quickly inflated. Particularly, when the seat 12 corresponds to the passenger seat, various cases can be generated, in which an adult sits on the seat 12, a child sits on the seat 12, the CRS is mounted on the seat 12, or nothing exists on the seat 12. Thus, the sitting signal in response to these cases is inputted to the air bag ECU 30, and then the air bag device provided at the passenger seat is properly controlled.

Figure 3:
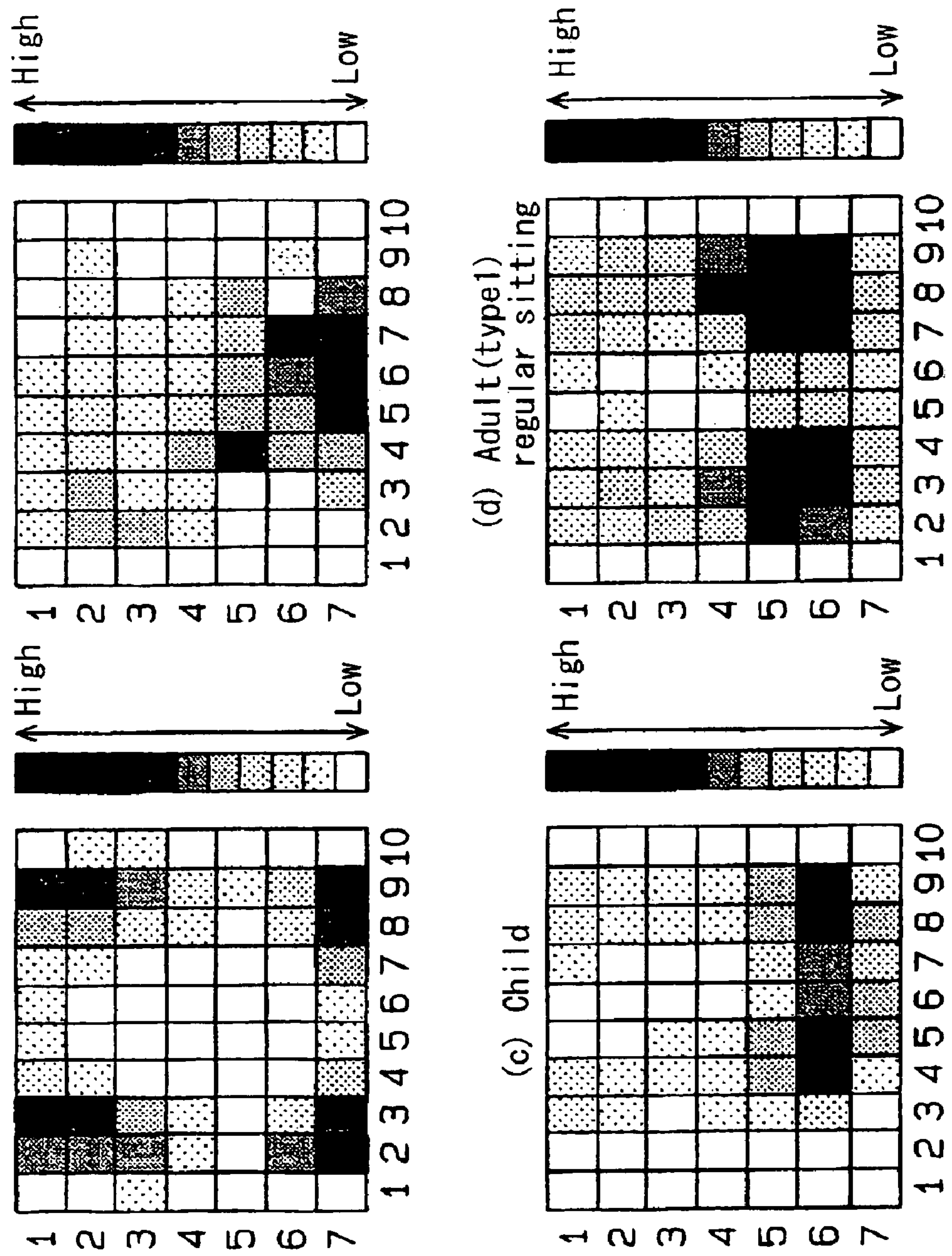
FIG. 3 is diagram for explaining detected result (pressure distribution) by the pressure sensor.
Figure 4:
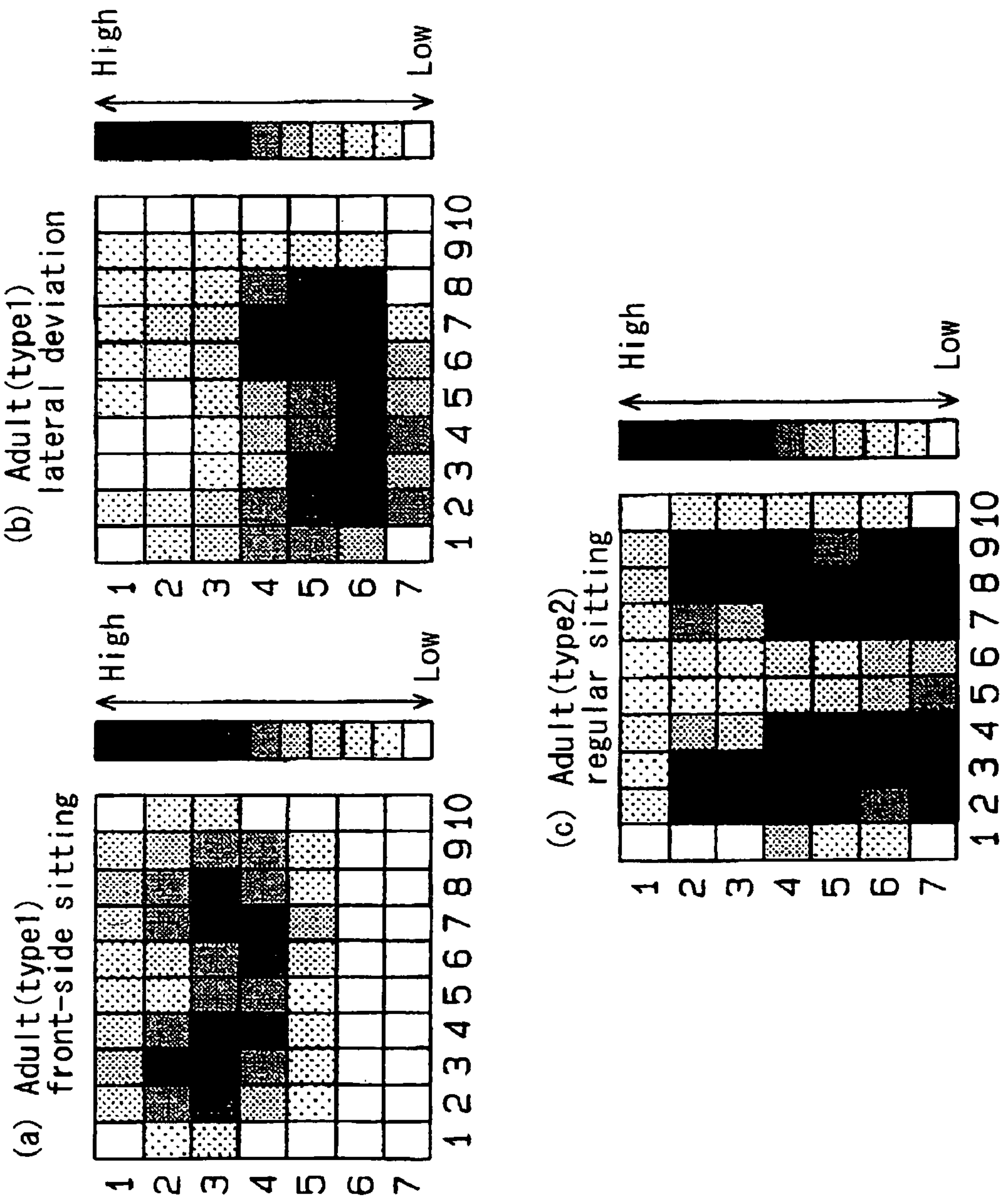
FIG. 4 is a diagram for explaining detected result (pressure distribution) by the pressure sensor.

FIG. 3 and FIG. 4 show examples of detected results (pressure distribution) in several cases by the pressure sensor 10 (the cell 13), in which the CRS is mounted on the seat 12, the child sits on the seat 12, and the adult sits on the seat 12. FIG. 3(*a*), (*b*) show examples of the pressure distribution in which CRS1 and CRS2 (having a different shape from the CRS1) are mounted on the seat 12. FIG. 3(*c*) is an example of the pressure distribution in which the child sits on the seat 12, and FIG. 3(*d*) is an example of the pressure distribution in which the adult (type 1) regularly sits on the seat 12 (hereinafter referred to as "regular sitting"). FIG. 4(*a*) is an example of the pressure distribution in which the adult (type 1) sits on the seat 12 at the front side (hereinafter referred to as "front-side sitting"), FIG. 4(*b*) is an example of the pressure distribution in which the adult (type 1) sits on the seat 12 so as to deviate leftward or rightward from the center of the sitting part in the width direction (hereinafter, referred to as "lateral deviation"), and FIG. 4(*c*) is an example of the pressure distribution in which the adult (type 2) regularly sits on the seat 12. The adult (type 2), for example, corresponds to a well-built adult relative to the adult (type 1) and weighs heavier than the adult (type 1).

In FIG. 3 and FIG. 4, a lateral axis corresponds to the width direction of the seat 12, a vertical axis corresponds to the back-and-forth direction of the seat 12, and a numeral indicated on each axis correspond to a position of the cell 13. In addition, an explanatory note for showing level of load (partial pressure) detected by each cell 13 is indicated at the right-hand side of each detected result. As apparently shown in FIG. 3 and FIG. 4, each pressure distribution has own characteristic, which indicates that the above-described cases can be determined.

Hereinafter, the following explanation will provides a manner of determination process of the occupant weight detecting device according to the embodiment along with a content of process performed by the controller 11 with reference to flow charts shown in FIGS. 5–8.

Figure 9:
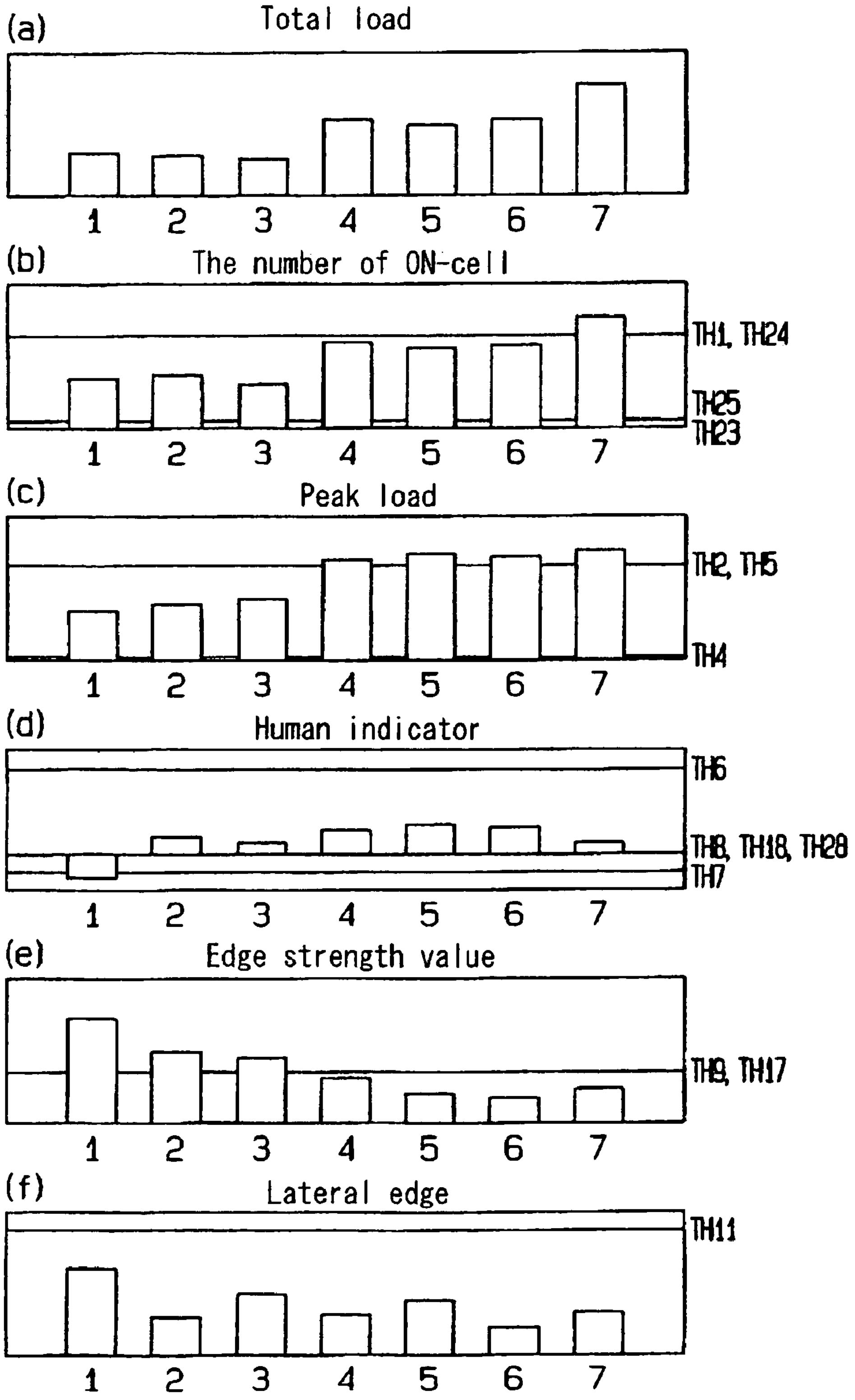
FIG. 9 is a graph showing various calculation results.
Figure 10:
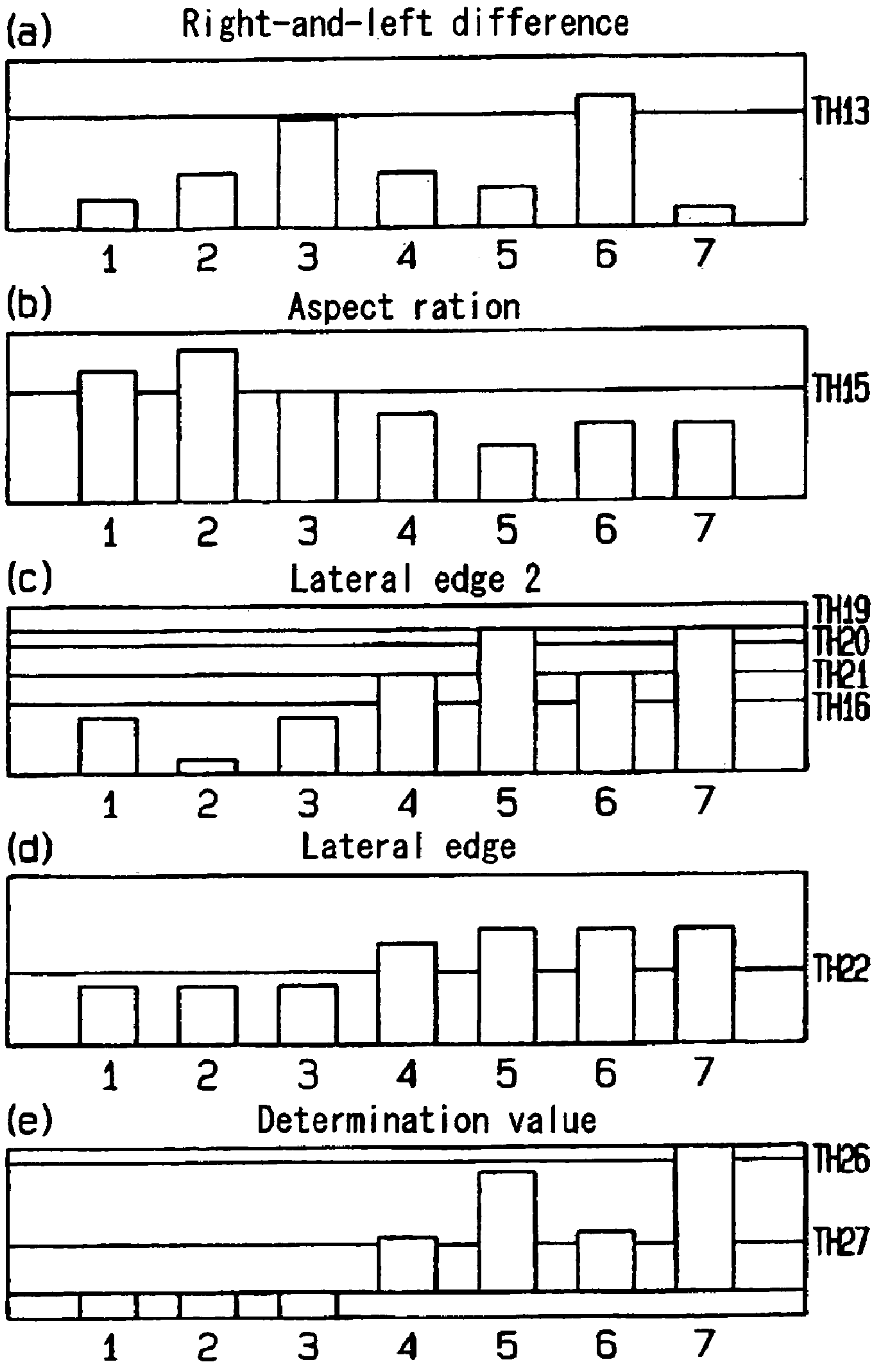
FIG. 10 is a graph showing various calculation results.

FIG. 9 and FIG. 10 show calculation results at each state on the seat 12 in FIG. 3 and FIG. 4 calculated by the determination process of the occupant weight detecting device. With respect to lateral axes 1–7 in each graph shown in FIG. 9 and FIG. 10, a numeral "1"corresponds to the CRS1 in FIG. 3(*a*), a numeral "2" corresponds to the CRS2 in FIG. 3(*b*), a numeral "3" corresponds to the child in FIG. 3(*c*), a numeral "4" corresponds to the "regular sitting" of the adult (type 1) in FIG. 3(*d*), a numeral "5" corresponds to the "front-side sitting" of the adult (type 1) in FIG. 4(*a*), a numeral "6" corresponds to the "lateral deviation" of the adult (type 1) in FIG. 4(*b*), and a numeral "7" corresponds to the "regular sitting" of the adult (type 2) in FIG. 4(*c*).

FIGS. 9(*a*)–(*f*) are graphs for showing "total load", "the number of ON-cell", "peak load", "human indicator" "edge strength value", and "lateral edge" corresponding to various calculation results used for the determination process. FIGS. 10(*a*)–(*e*) are graphs for showing "right-and-left difference", "aspect ratio", "lateral width 2", "lateral width", and "determination value" corresponding to various calculation results used for the determination process. Thresholds THn ("n" is a predetermined integer) shown in each graph respectively correspond to thresholds used in after-mentioned flow charts.

In the embodiment, the CPU 21 basically performs the determination process by the determination value based on the value of the cells 13. When the state on the seat 12 strongly tends to the adult, a coefficient (positive number) is added to an after-mentioned determination value. On one hand, when the state on the seat 12 weakly tends to the adult, that is when the state on the seat 12 strongly tends to the child or the CRS, a coefficient (positive number) is subtracted from the determination value. Then, the CPU 21 finally determines whether the state on the seat 12 corresponds to the adult, the child, or the CRS finally based on the corrected determination value.

Figure 5:
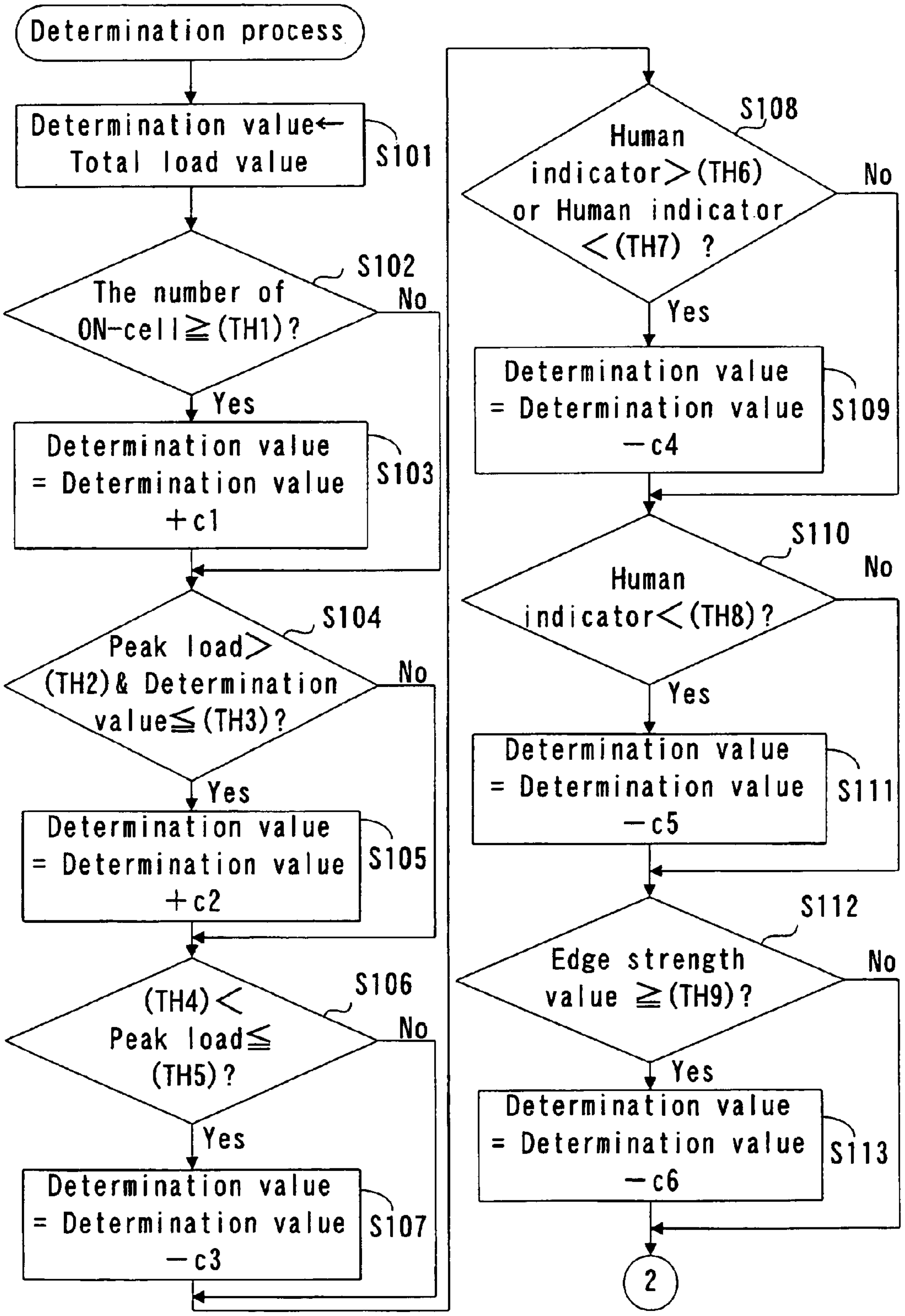
FIG. 5 is a flowchart for explaining a manner of determination process.

The determination process shown in FIGS. 5–8 is performed every predetermined period. When this determination process is started, as shown in FIG. 5, the CPU 21 initially reads out data of partial pressure X(i, j) detected by the cell 13 of the pressure sensor 10 at step (hereinafter referred to as "S") 101 and calculates the total load (ref. FIG. 9(*a*)) by summing all the partial pressure X(i, j). Then, the CPU 21 memorizes a value of the total load in a memory as the determination value, and the process proceeds to S102.

At S102, the CPU 21 counts the number of cells 13 as the "the number of ON-cell", in which the detected partial pressure X(i, j ) exceeds a predetermined pressure, and determines whether the "number of ON-cell" is equal to or greater than a predetermined threshold TH1. The threshold TH1 (ref. FIG. 9(*b*)) is set to a preferred value for distinguishing the adult (type 2), when the determination value is equal to or greater than the threshold TH1, a determined subject strongly tends to the adult (type 2). When the CPU 21 determines that "the number of ON-cell" is equal to or greater than the threshold TH1, the process proceeds to S103. At S103, the CPU 21 adds a coefficient C1 to the determination value and updates the determination as the current determination value, and the process proceeds to S104. On one hand, when the CPU 21 determines that "the number of ON-cell" is less than the threshold TH1 at S102, the process proceeds to S104.

At S104, the CPU 21 determines whether the "peak load" is greater than a threshold TH2 and whether the determination value is equal to or less than a threshold TH3. Next, the explanation about the "peak load" is provided based on FIG. 11. Pressure distribution shown in FIG. 11(*a*) is one of the examples and different from the pressure distribution in FIG. 3 and FIG. 4.

Figure 11:
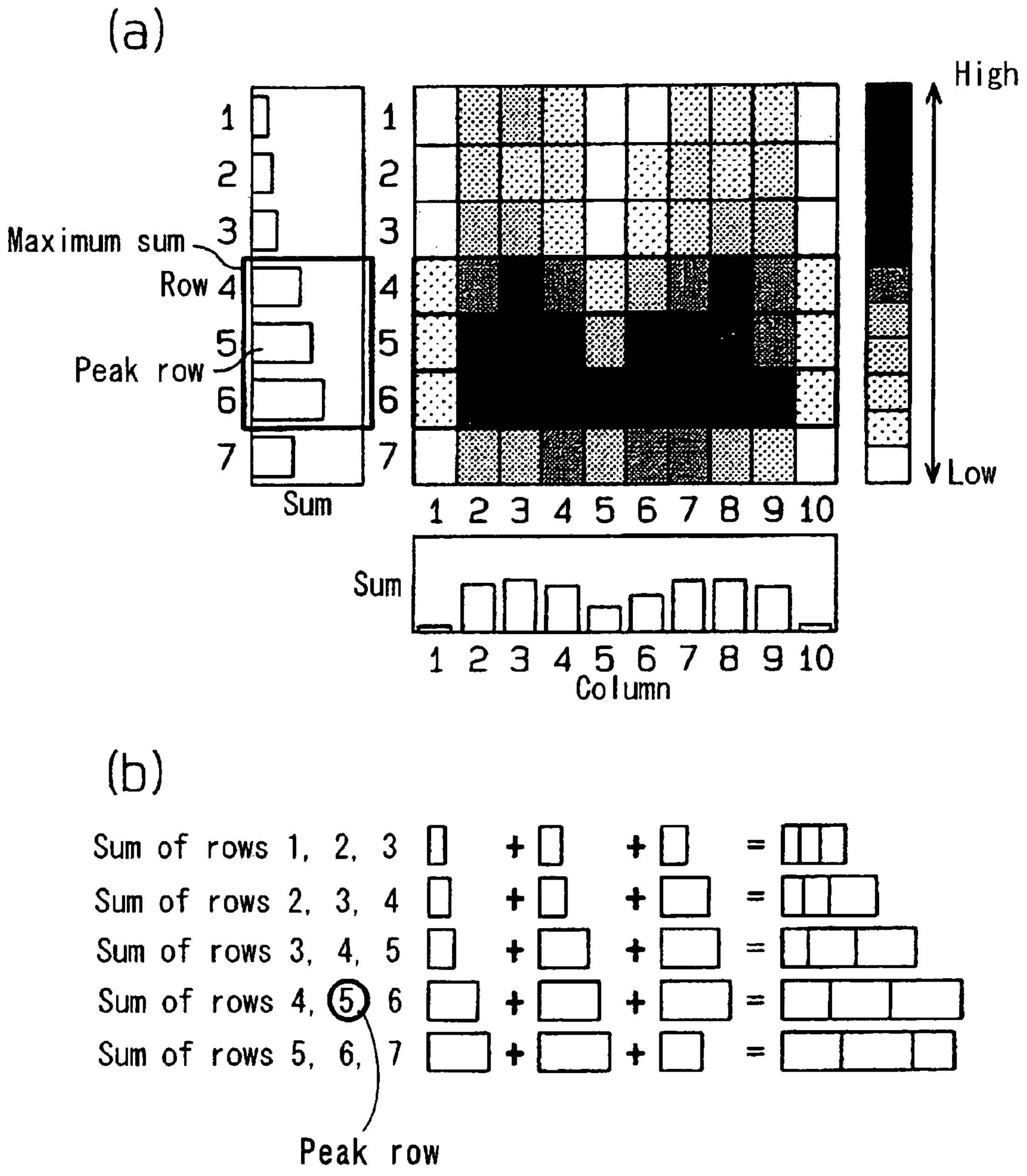
FIG. 11 is a graph for explaining "peak load"

The CPU 21 calculates the "peak load" based on the partial pressure X(i, j) of all the cells 13 which are read out at the beginning of the determination process. As shown in FIG. 11(*b*), the CPU 21 calculates the sum of partial pressure per three rows adjoining in the back-and-forth direction among the cells 13 based on the pressure distribution in FIG. 11(*a*) and compares each sum of the partial pressure per three rows. In this case, there are five patterns as the sum of the partial pressure per three rows according to the seven rows, and all the patterns are compared. Then, the maximum sum per three rows is memorized as the "peak load", and a middle row among the three rows showing the "peak load" is memorized as a peak row. In this case, the fourth, the fifth, and the sixth rows of the pressure-sensor 10 (cell 13) correspond to the three rows showing the "peak load", and the fifth row corresponds to the peak row.

The "peak load" shows a value which indicates the total load without reference to a sitting position even if the total load decreases in the pressure distribution by the front-side sitting of the adult. In other words, when the CPU 21 determines based on only the determination value by the value of the total load, the adult can be determined as the child depending on a sitting posture. In the embodiment, the "peak load" is used together with the determination value, and error of determination can be reduced.

At S104, when the CPU 21 determines that the "peak load" is greater than the threshold TH2 and that the determination value is equal to or less than the threshold TH3, the process proceeds to S105. The threshold TH2 (ref. FIG. 9(*c*)) is set to a preferred value for distinguishing the adult, when the determination value is greater than the threshold TH2, the determined subject strongly tends to the adult without reference to a sitting manner and build. Then, at S105, the CPU 21 adds a coefficient C2 to the determination value and updates the determination value as the current determination value, and the process proceeds to S106. On one hand, the condition at S104 is not satisfied, the process proceeds to S106.

At S106, the CPU 21 determines whether the "peak load" is greater than a threshold TH4 and whether the "peak load" is equal to or less than a threshold TH5, when this condition is satisfied, the process proceeds to S107. The thresholds TH4 and TH5 (ref. FIG. 9(*c*)) are set to preferred values so that a range between the thresholds TH4 and TH5 can correspond to the child and the CRS, when the "peak load" is between the thresholds TH4 and TH5, the determined subject strongly tends to the child or the CRS. At S107, the CPU 21 subtracts a coefficient C3 from the determination value and updates the determination value as the current determination value, and the process proceeds to S108. On one hand, the condition at S106 is not satisfied, the process proceeds to S108.

At S108, the CPU 21 determines the "human indicator". Hereinafter, an explanation about the "human indicator" is provided. As shown in FIG. 3, with respect to the detected partial pressure X(i, j), an aspect of distribution in which an occupant sits on the seat 12 (e.g. FIGS. 3(*a*), (*b*)) is different from an aspect of distribution in which the CRS is mounted on the seat 12 (e.g. FIGS. 3(*c*), (*d*)). That is, when the occupant sits on the seat 12, a certain level of the partial pressure is detected at the cells 13 which are located at the approximately center of the seat 12. On one hand, when the CRS is mounted on the seat 12, a certain level of the partial pressure is detected at the cells 13 which are located at the approximately peripheral part of the seat 12. In other words, with reference to the partial pressure X(i, j) detected by the plural cells 13, the aspect of distribution in which the occupant sits on the seat 12 has a reverse tendency relative to the aspect of distribution in which the CRS is mounted on the seat 12.

Figure 13:
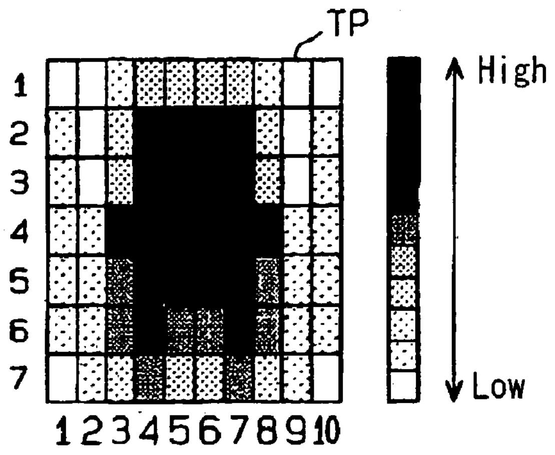
FIG. 13 is a graph for explaining "human indicator"

In the embodiment, as shown in FIG. 13, a base pressure template TP is provided and memorized in the ROM, in which a base pressure TEMP(i, j) is set at each cell 13 so that cases in which the occupant sits on the seat 12 (ref. FIGS. 3 and 4) can be comprehensively indicated and that an experimental tendency of the CRS can be prevented. The base pressure template TP indicates distribution of the base pressure TEMP(i, j) in an allocation of the 7×10 matrix corresponding to a shape of the pressure sensor 10. The average of the base pressure TEMP(i, j) provided at each cell 13 is set to a value of "zero". (In FIG. 13, actual pressure is illustrated as the distribution for convenience.)

Then, the "human indicator" is calculated as the sum of products between the partial pressure X(i, j) detected at each cell 13 and the base pressure TEMP(i, j) of the corresponding cell 13. In this case, when the partial pressure X(i, j) detected at each cell 13 and the base pressure TEMP(i, j) of the corresponding cell 13 indicate the same tendency, which has an influence on increase of the "human indicator". On one hand, the partial pressure X(i, j) detected at each cell 13 and the base pressure TEMP(i, j) of the corresponding cell 13 indicate the reverse tendency, which has an influence on decrease of the "human indicator". Therefore, the CPU 21 detects whether the detected result of the pressure sensor 10 and the base pressure template TP generally indicate the same tendency by the "human indicator" finally calculated. That is, the occupant sitting on the seat 12 is indicated by polarity of the "human indicator" (positive and negative).

At S108, the CPU 21 determines whether the "human indicator" is greater than a threshold TH6 and whether the "human indicator" is less than a threshold TH7, when this condition is satisfied, the process proceeds to S109. The thresholds TH6 and TH7 (ref. FIG. 9(*d*)) are set to preferred values so that the determined subject does not apparently tend to the occupant (the adult or child) when the "human indicator" is not between the TH6 and TH7. Then, the CPU 21 subtracts a coefficient C4 from the determination value and updates the determination value as the current determination value at S109, and the process proceeds to S110. On one hand, when the condition at S108 is not satisfied, the process proceeds to S110.

At S110, the CPU 21 determines whether the "human indicator" is less than a threshold TH8, when this condition is satisfied, the process proceeds to S111. The thresholds TH8 (ref. FIG. 9(*d*)) is set to a preferred value for distinguishing the CRS, when the "human indicator" is less than the threshold TH8, the determined subject strongly tends to the CRS. Then, the CPU 21 subtracts a coefficient C5 from the determination value and updates the determination value as the current determination value at S111, and the process proceeds to S112. On one hand, when the condition at S110 is not satisfied, the process proceeds to S112.

Next, the CPU 21 determines the "edge strength value". Hereinafter, an explanation about the "edge strength value" is provided. Generally, when the CRS is mounted on the seat 12, a sharp pressure difference (edge) is generated between the partial pressure X(i, j) detected at a predetermined cell 13 and the partial pressure detected at the cell 13 adjoining the predetermined cell 13 as compared to the occupant sitting on the seat 12. The CRS as a structure is harder than the occupant, and the CRS is fastened to the seat 12 via a seat belt. This is why the sharp pressure difference is generated at contact points between the CRS and the seat 12. Therefore, the CRS mounting on the seat 12 is indicated by a degree of the pressure difference.

In the embodiment, the "edge strength value" is calculated as an indicator for showing the pressure difference. In this calculation, the CPU 21 initially calculates difference ΔX(i, j) between the partial pressure X(i, j) detected at each cell 13 and the average of the partial pressure detected at the cells 13 adjoining the cell 13 with reference to all the cells 13.

Figure 12:
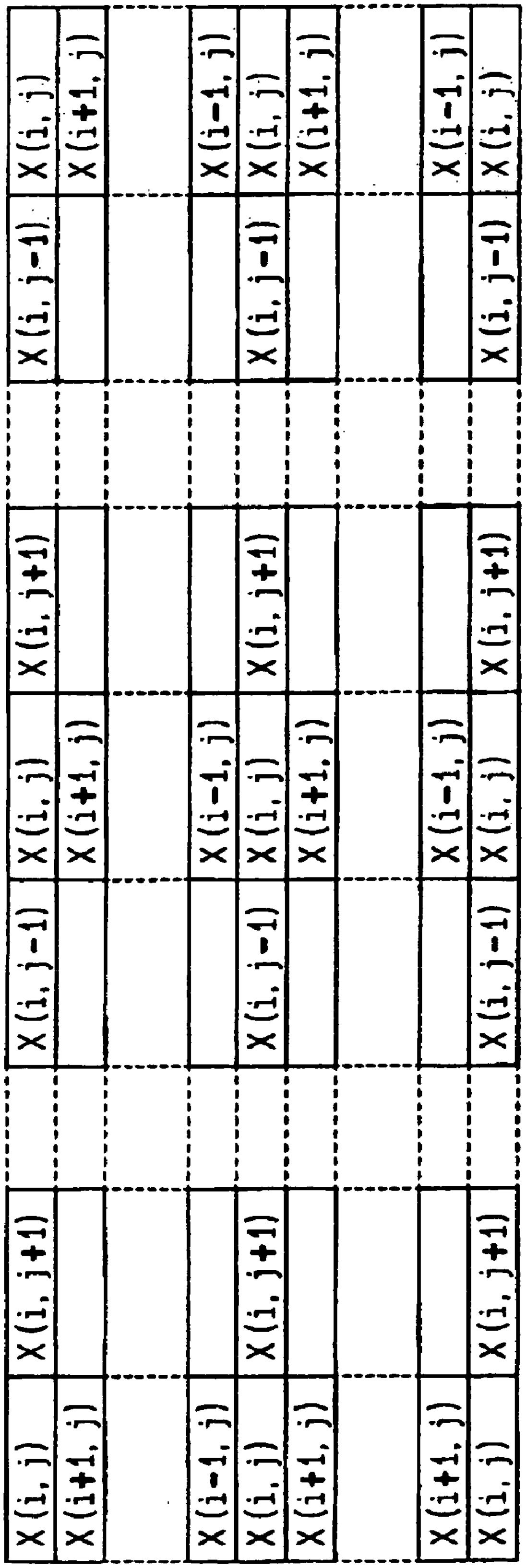
FIG. 12 is a graph for explaining "edge strength value"

As shown in FIG. 12, with respect to a predetermined cell 13 and four cells 13 adjoining the predetermined cell 13, the difference ΔX(i, j) is basically calculated by the following formula.

$$\Delta X(i,j)=X(i,j)-\{X(i-1,j)+X(i+1,j)+X(i,j-1)+X(i,j+1)\}/4$$

For example, when the predetermined cell 13 adjoins only three cells 13 as with the cell 13 located at a periphery at the left-hand side of the width direction, the difference ΔX(i, j ) is calculated based on the following formula.

$$\Delta X(i,j)=X(i,j)-\{X(i+1,j)+X(i-1,j)+X(i,j+1)\}/3$$

With reference to the cells 13 located at a periphery at the right-hand side, the upper side, and the lower side, the difference ΔX(i, j) is calculated correspondingly. Further, when the predetermined cell 13 adjoins only two cells 13 as with the cell 13 located at a corner at the upper left, the difference ΔX(i, j) is calculated based on the following formula.

$$\Delta X(i,j)=X(i,j)-\{X(i+1,j)+X(i,j+1)\}/2$$

With reference to the cells 13 located at a periphery at the lower left, the upper right, and the lower right, the difference ΔX(i, j) is calculated correspondingly.

In this way, the difference ΔX(i, j) is calculated at all the cells 13, and the sum of these difference ΔX(i, j) is calculated as a total edge strength value. Further, the "edge strength value" is calculated by dividing the total edge strength value by the total load corresponding to the sum of the partial pressure X(i, j) detected at all the cell 13s. In this case, the "edge strength value" may be calculated by dividing the total edge strength value by "the number of ON-cell" detected then.

Generally, when the occupant (adult) sits on the seat 12, even if the pressure difference is totally modest, the total edge strength value is increased since contact area between the occupant and the seat 12 is large. On one hand, when the CRS is mounted on the seat 12, even if the pressure difference is sharp, increase in the total edge strength value is prevented since contact area between the CRS and the seat 12 is small. Therefore, even if the CRS is mounted on the seat 12, the total edge strength value can have an approximately same value at the case in which the occupant (adult) sits on the seat 12 depending on the contact area and a characteristic of the pressure difference. In order to totally absorb the influences of the contact area, the "edge strength value" is calculated by the foregoing manner.

Figure 6:
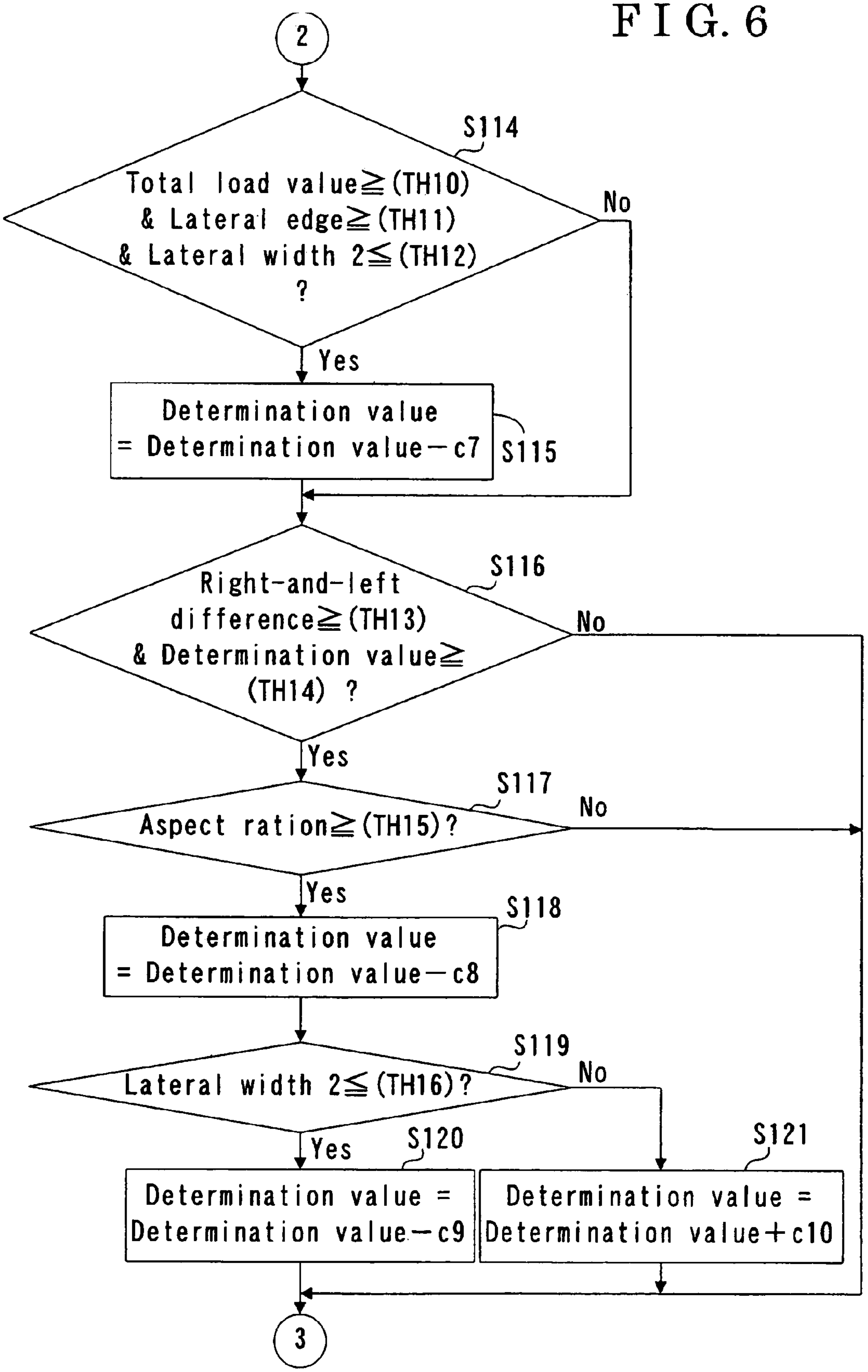
FIG. 6 is a flowchart for explaining the manner of determination process.

At S122, the CPU 21 determines whether the "edge strength value" is equal to or greater than a threshold TH9, when the "edge strength value" is equal to or greater than the threshold TH9, the process proceeds to S113. The threshold TH9 (ref. FIG. 9(*e*)) is set to a preferred value for distinguishing the adult, when the determination value is equal to or greater than the threshold TH9, the determined subject strongly tends to except the adult (the child or the CRS). Then, the CPU 21 subtracts a coefficient C6 from the determination value and updates the determination value as the current determination value at S113, and the process proceeds to S114 (ref. FIG. 6). On one band, the condition at S112 is not satisfied, the process proceeds to S114.

As shown in FIG. 6, the CPU 21 determines that the "total load", the "lateral edge", and the "lateral width 2" as peak width. Hereinafter, an explanation about the "lateral width 2" and the "lateral edge" is provided.

First, the explanation about the "lateral width 2" is provided with reference to FIG. 15. FIG. 15(*a*) shows the pressure distribution in which the adult regularly sits on the seat 12 as one of the examples. In the cells 13 corresponding to three rows including the peak row similarly calculated as with the calculation of the "peak load", with reference to the cells 13 surrounded by a full line, the sum of partial pressure is calculated in the back-and-forth direction (hereinafter referred to as a peak-row adjoining columns). The sum is shown in a diagram of the pressure distribution at the lower side. The sum is compared with a width threshold NH. The width threshold NH is set based on a general pressure distribution at the peak-row adjoining columns, in which the adult regularly sits on the seat 12. Then, the sum of the peak-row adjoining columns greater than the width threshold NH is counted, and the number of counts W1 is calculated as the "lateral width 2".

Figure 14:
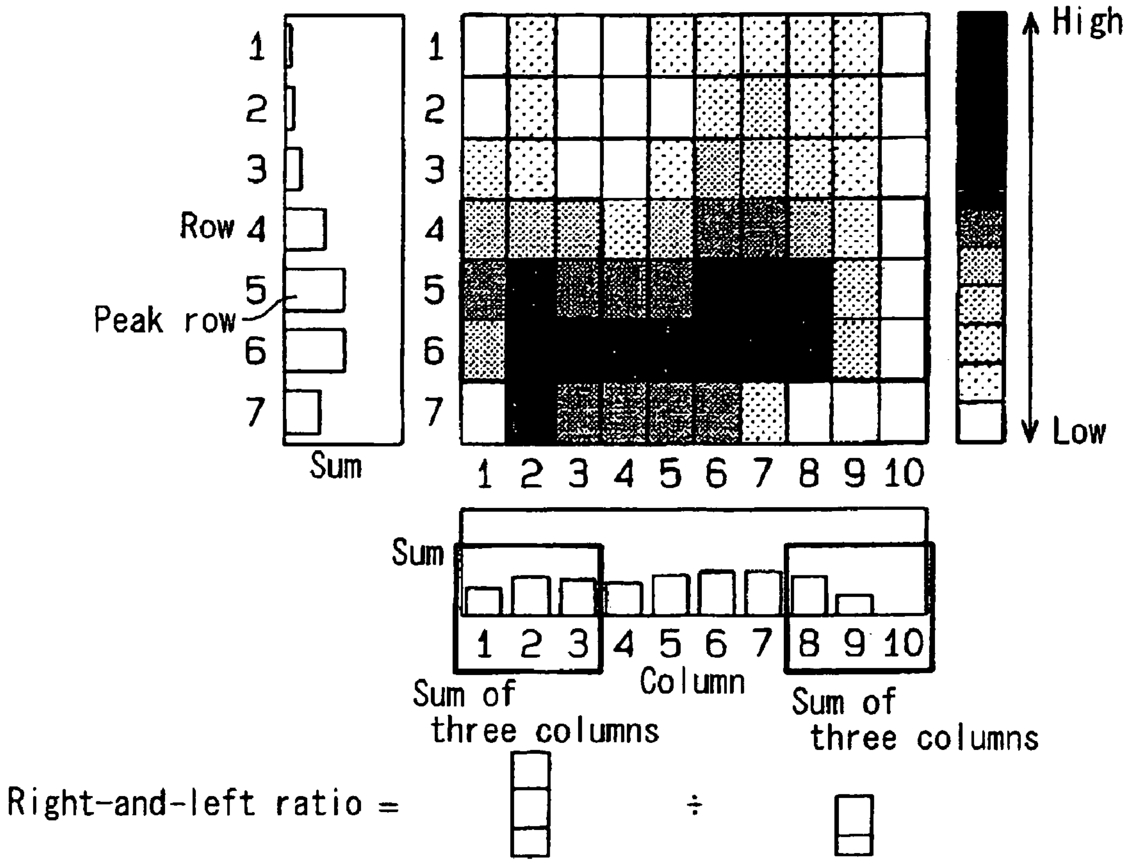
FIG. 14 is a graph for explaining "right-and-left ratio"

On one hand, when the detected subject deviates leftward or rightward from the center of the sitting part, corrected "lateral width 2" is calculated as described below. FIG. 14 is a diagram about "right-and-left ratio" for determining deviation with reference to the calculation of the "lateral width 2". First, with reference to the cells 13 corresponding to the three rows from both lateral ends (i.e. the leftward and rightward three rows) among the peak-row adjoining columns, the sum of partial pressure is calculated. Then, when the sum at the leftward three rows is greater than the sum at the rightward three rows, the "right-and-left ratio" is calculated by dividing the sum at the leftward three rows by the sum at the rightward three rows. On one hand, when the sum at the rightward three rows is greater than the sum at the leftward three rows, the "right-and-left ratio" is calculated by dividing the sum at the rightward three rows by the sum at the leftward three rows and adding the negative sign to the divided value. This negative sign is added for distinguishing whether the determined subject deviates leftward or rightward by distinguishing the "right-and-left ratio" based on the positive and negative sign. Then, when the absolute value of the calculated "right-and-left ratio" is greater than a predetermined threshold, the CPU 21 can determine that the determined subject on the seat deviates from the center of the sitting part.

In the calculation of the "lateral width 2", a width threshold, which is deviated in the width direction corresponding to the leftward and rightward deviation, is applied as shown in FIG. 15(*b*). FIG. 15(*b*) shows a case in which the "right-and-left ratio" is positive, and the absolute value of the "right-and-left ratio" is greater than a predetermined threshold. In this case, the CPU 21 can determine that the detected subject deviates leftward from the center of the sitting part based on the "right-and-left ratio", and the width threshold is set to a width threshold for leftward deviation LH. As shown in FIG. 15(*b*), the width threshold for leftward deviation LH is set to be moved leftward by a cell relative to the normal width threshold. Then, among the sum per the peak-row adjoining columns, the sum being equal to or greater than the width threshold for leftward deviation LH is counted, and the number of counts W1 is calculated as the "lateral width 2".

Additionally, in the calculation of the "lateral width 2", the "lateral width 2" is further corrected by the "right-and-left ratio". When the absolute value of the "right-and-left ratio" is greater than a predetermined threshold of right-and-left ratio, a correction coefficient of right-and-left ratio is added to the "lateral width 2". The predetermined threshold of right-and-left ratio is set to a preferred value for detecting deviation beyond a range of the width threshold for leftward deviation LH and a width threshold for rightward deviation. Then, when the CPU 21 detects the "right-and-left ratio" being greater than the predetermined threshold of right-and-left ratio, a correction coefficient of right and left ratio W2 is added to the "lateral width 2" for reducing a determination error by the deviation.

Figure 16:
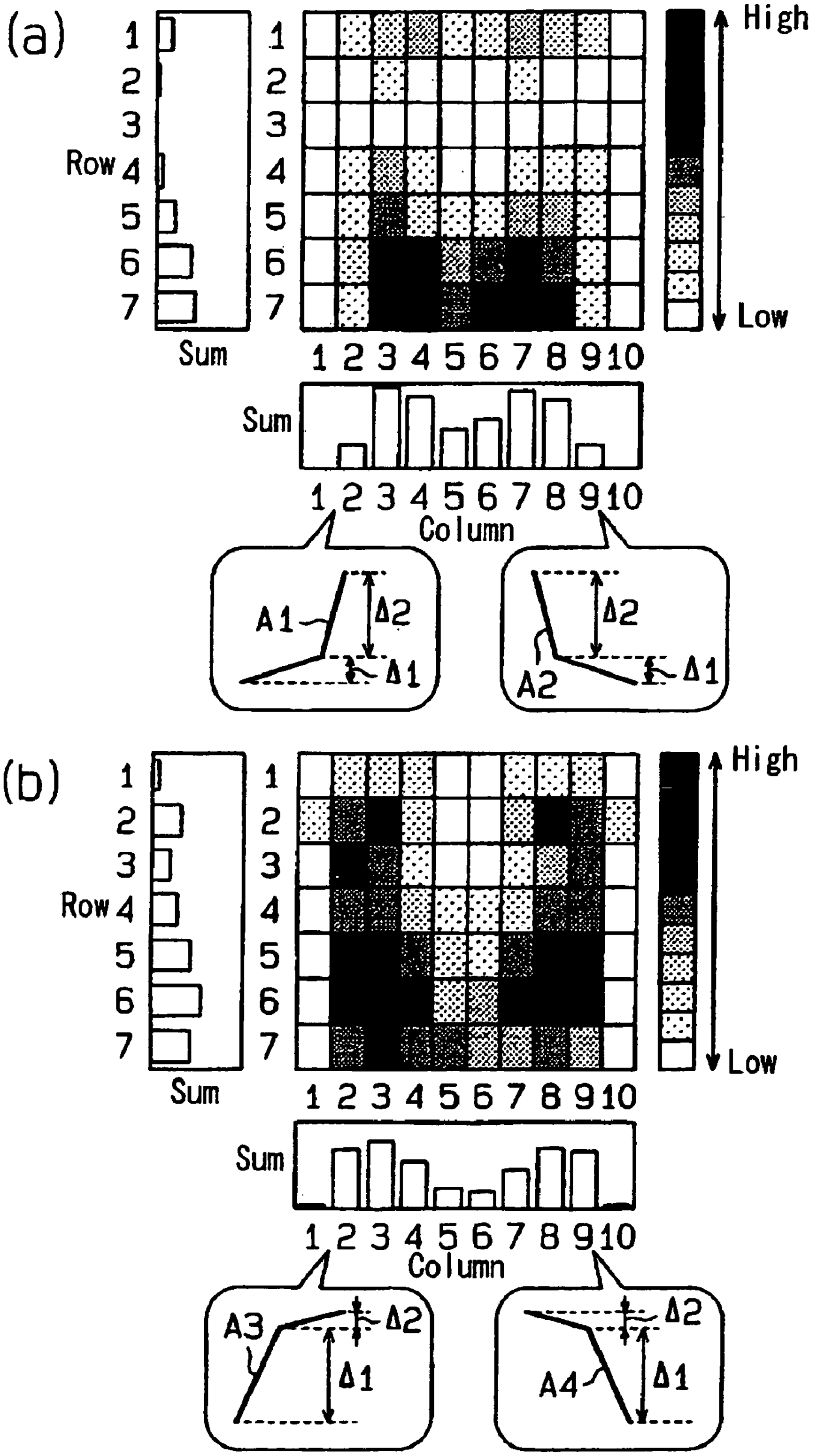
FIG. 16 is a graph for explaining "lateral variation"

Further, in the calculation of the "lateral width 2", the "lateral width 2" is further corrected by "lateral variation" described below. FIGS. 16(*a*) and (*b*) are explanatory diagrams about the "lateral variation" as variation used for the calculation of the "lateral width 2". FIG. 16(*a*) shows the pressure distribution of the child as one of the examples, and FIG. 16(*b*) shows the pressure distribution of the adult as one of the examples. First, in both sides with reference to the middle of the width direction among the cells 13, the CPU 21 detects a minimum column having the minimum sum from the column at one end and the other end (right and left side in FIG. 16). In FIG. 16(a), the first and the tenth columns correspond to the minimum columns. Then, the CPU 21 calculates a first difference Δ1 in both sides by subtracting the sum at the minimum column from the sum at a second column adjoined by the detected minimum column toward the middle of the width direction. In FIG. 16(a), the second and the ninth columns correspond to the second columns. Then, the CPU 21 calculates a second difference Δ2 in both sides by subtracting the sum at the second column from the sum at a third column adjoined by the second column toward the middle of the width direction. In FIG. 16(a), the third and the eighth columns correspond to the third columns. Then, the CPU 21 calculates leftward variation at the left side (columns 1, 2, 3) and rightward variation at the right side (columns 8, 9, 10) by subtracting the second difference Δ2 from the first difference Δ1. In FIG. 16(a), the leftward variation and the rightward variation are negative values, in this case, the CPU 21 sets a corresponding flag to "1" based on the "lateral variation" showing a concave shape (a shape of graph shown by A1 and A2 in FIG. 16(a)). On one hand, in FIG. 16(b), the leftward variation and the rightward variation having positive values are calculated by similar calculation. Then, the CPU 21 sets a corresponding flag to "−1" based on the "lateral variation" showing a convex shape (a shape of graph shown by A3 and A4 in FIG. 16(b)). When the "lateral variation" does not satisfy the foregoing two conditions, the CPU 21 sets a corresponding flag to [0].

As apparently shown in the above-described characteristics of pressure distribution of the adult and child, the CPU 21 can determine whether the determined subject strongly tends to the child or the adult based on the shape of the "lateral variation" (flag). When the corresponding flag of the "lateral variation" is [−1], the determined subject strongly tends to the adult, and the "lateral width 2" is not corrected. On one hand, when the corresponding flag of the "lateral variation" is [1], the determined subject strongly tends to the child, and the CPU 21 corrects the "lateral width 2" so that a value of the "lateral width 2" can be decreased by subtracting a correction coefficient of lateral width variation W3 from the "lateral width 2".

In response to the foregoing calculation manner, the "lateral width 2" is finally calculated by the following formula.

"lateral width 2"=the number of counts $W1$+correction coefficient of right and left ratio $W2$−correction coefficient of lateral width variation $W3$ Next, an explanation about the "lateral edge" is provided with reference to FIG. 17. FIG. 17(a) shows the pressure distribution of the adult corresponding to the "regular sitting" as one of the examples. Among the peak-row adjoining columns, when the sum of the adjoining column is equal to or greater than a predetermined threshold shown by a dotted line, as shown in FIG. 17(b), the CPU 21 calculates difference between the sum at the column and the sum at the adjoining column (in this case, difference between the sum of a certain peak-row adjoining column and the sum of the column adjoining leftward to the certain peak-row adjoining column). In FIG. 17, the difference is shown by hatching. Then, as shown in FIG. 17(c), the CPU 21 sums the absolute value of the difference per the peak-row adjoining columns and divides the summed value by the value of the total load, which corresponds to the "lateral edge". That is, the "lateral edge" is calculated by the following formula.

"lateral edge"={(the sum of (the absolute value of) difference between the peak-row adjoining columns)/total load}×100

At S114, the CPU determines whether the "total load value" is equal to or greater than a threshold TH10, whether the "lateral edge" is equal to or greater than a threshold TH11, and whether the "lateral width 2" is equal to or less than a threshold TH12. When the condition at S114 is satisfied, the process proceeds to S115. The threshold TH10 (not shown) is set to a preferred value for distinguishing the adult, when the "total load value" is equal to or greater than the threshold TH10, the determined subject strongly tends to the adult. The threshold TH11 (ref. FIG. 9(f)) is set to a preferred value for distinguishing a case in which the determined subject does not correspond to any of the CRS, the child, and the adult, when the "lateral edge" is equal to or greater than the threshold TH11, the determined subject does not strongly tend to any of the CRS, the child, and the adult. Further, the threshold TH12 (not shown) is set to a preferred value for distinguishing the child or the CRS, when the "lateral width 2" is equal to or less than the threshold TH12, the determined subject strongly tends to the child or the CRS. This is why the CPU 21 determines the unclear state in which the determined subject can be determined as the child or the adult at S114. Then, the CPU 21 subtracts a coefficient C7 from the determination value in consideration of the unclear state and updates the determination value as the current determination value at S115, and the process proceeds to S116. On one hand, when the condition at S114 is not satisfied, the process proceeds to S116 correspondingly.

At S116, the CPU 21 determines the "right-and-left difference" and the determination value. The "right-and-left difference" is a value for showing a degree of deviation between the sum of partial pressure at the left side (leftward load value) and the sum of partial pressure at the right side (rightward load value) with reference to the middle of the width direction in the pressure sensor 10 (the cells 13). The "right-and-left difference" is calculated by the following formula.

"right-and-left difference"=|leftward load value×rightward load value|

At S116, the CPU 21 determines whether the "right-and-left difference" is equal to or greater than a threshold TH13 and whether the determination value is equal to or greater than a threshold TH14, and when the condition at S116 is fulfilled, the process proceeds to S117. The threshold TH113 (ref. FIG. 10(a))is set to a preferred value for determining whether the determined subject on the seat deviates from the center of the sitting part (lateral deviation), when the "right-and-left difference" is equal to or greater than the threshold TH13, the determined subject strongly corresponds to the lateral deviation.

Next, the CPU 21 determines the "aspect ratio" at S117. The "aspect ratio" is a value for showing load distribution of the width direction (lateral direction) relative to the back-and-forth direction (vertical direction) of the pressure sensor 10 (the cells 13). The "aspect ratio" is the ratio of a vertical width, which is counted as the sum of pressure at each row is equal to or greater than a predetermined threshold at each row, to a lateral width counted as the sum of pressure at each column is equal to or greater than a predetermined threshold at each column. The "aspect ratio" is calculated by the following formula.

"aspect ratio"={vertical width/lateral width}×100

Generally, width of sitting pressure of the adult is wider than that of the child, based on this characteristic, the adult is distinguished from the child by the “aspect ratio”. Further, a certain CRS having the high “aspect ratio” can be determined by the “aspect ratio”.

At S117, the CPU 21 determines whether the “aspect ratio” is equal to or greater than a threshold TH15. When the condition at S117 is satisfied, the process proceeds to S118. The threshold TH15 (ref. FIG. 10(*b*)) is set to a preferred value for distinguishing the child or the CRS, when the “aspect ratio” is equal to or greater than the threshold TH15, the detected subject strongly tends to the child or the CRS. Then, the CPU 21 subtracts a coefficient C8 from the determination value and updates the determination value as the current determination value at S118, and the process proceeds to S119.

Figure 7:
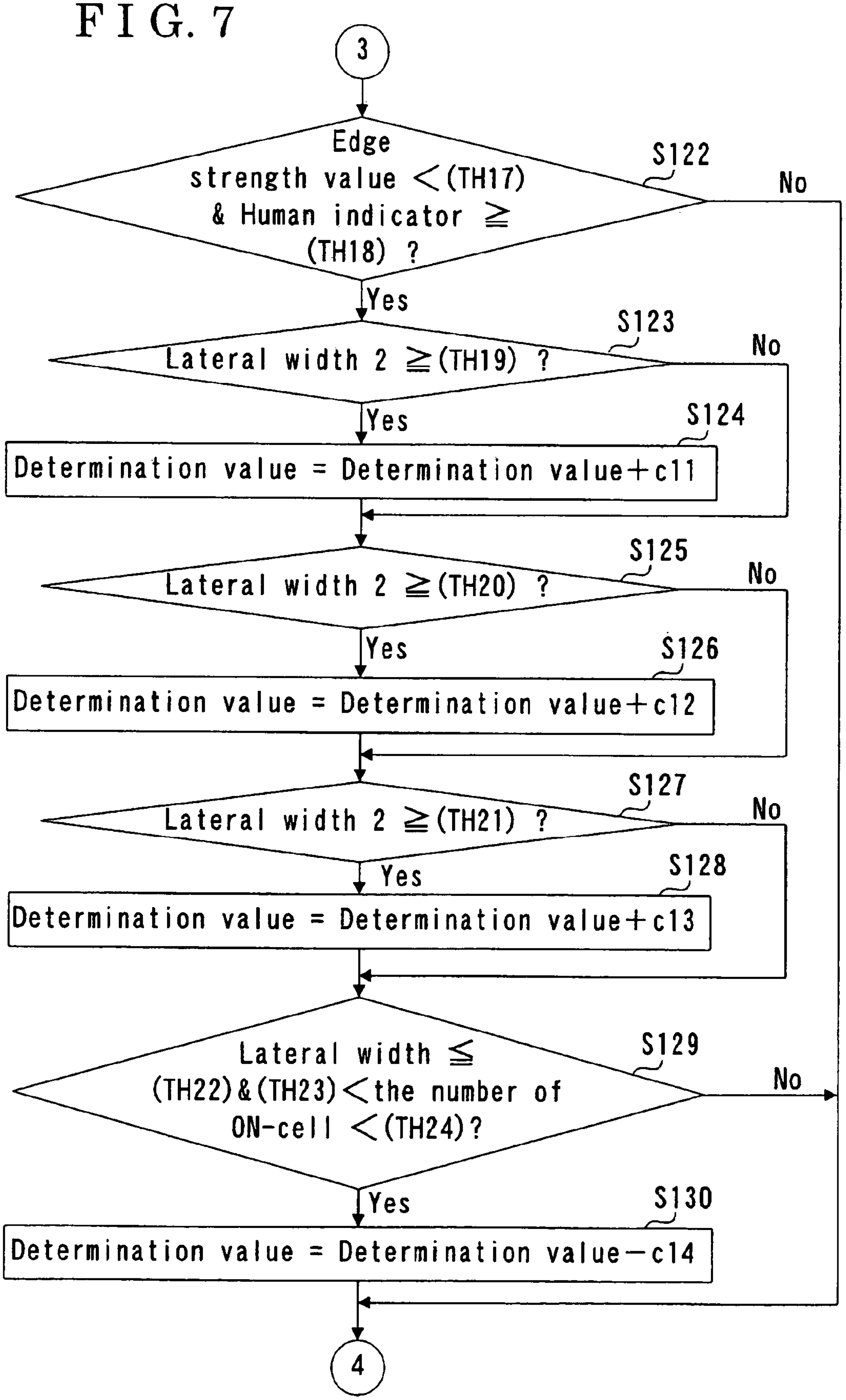
FIG. 7 is a flowchart for explaining the manner of determination process.

At S119, the CPU 21 determines whether the “lateral width 2” is equal to or less than a threshold TH16, when the “lateral width 2” is equal to or less than the threshold TH16, the process proceeds to S120. The threshold TH16 (ref. FIG. 10(*c*)) is set to a preferred value for distinguishing the child or the CRS, when the “lateral width 2” is equal to or less than the threshold T16, the detected subject strongly tends to the child or the CRS. Then, the CPU 21 subtracts a coefficient C9 from the determination value and updates the determination value as the current determination value at S120, and the process proceeds to S122 (ref. FIG. 7). On one hand, at S119, when the CPU 21 determines that the “lateral width 2” is greater than the threshold TH16, the process proceeds to S121. Then, the CPU 21 adds a coefficient C10 to the determination value and updates the determination value as the current determination value at S121, and the process proceeds to S122. When the condition at S116 is not satisfied, the process proceeds to S122. In addition, when the “aspect ratio” is less than the threshold TH15 at S117, the process proceeds to S122.

As shown in FIG. 7, the CPU 21 determines whether the “edge strength value” is less than a threshold TH17 and whether the “human indicator” is equal to or greater than a threshold TH18 at S122, when the condition at S122 is satisfied, the process proceeds to S123. The threshold TH17 (ref. FIG. 9(*e*)) is set to a preferred value for distinguishing the adult, when the “edge strength value” is less than the threshold TH17, the determined subject strongly tends to the adult. Correspondingly, the threshold 18 about the “human indicator” is set to a preferred value. At S123, when the “lateral width 2” is equal to or greater than a threshold TH19, the process proceeds to S124. The threshold TH19 (ref. FIG. 10(*c*)) is set to a preferred value for distinguishing the adult (particularly, the adult (type 2)), when the “lateral width 2” is equal to or greater than the threshold TH19, the determined subject strongly tends to the adult (type 2). Then, the CPU 21 adds a coefficient C11 to the determination value and updates the determination value as the current determination value at S124, and the process proceeds to S125. On one hand, when the condition at S123 is not satisfied, the process proceeds to S125.

At S125, the CPU 21 determines whether the “lateral width 2” is equal to or greater than a threshold TH20, when the “lateral width 2” is equal to or greater than the threshold TH20, the process proceeds to S126. The threshold TH20 (ref. FIG. 10(*c*)) is set to a preferred value for distinguishing the adult (type 1) though the threshold TH20 is less preferred than the threshold TH19, when the “lateral width 2” is equal to or greater than the threshold TH20 and when the “lateral width 2” is less than the threshold TH19, the detected subject strongly tends to the adult (type 1). Then, the CPU 21 adds a coefficient C12 to the determination value and updates the determination value as the current determination value at S126, and the process proceeds to S127. When the condition at S125 is not satisfied, the process proceeds to S127.

At S127, the CPU 21 further determines whether the “lateral width 2” is equal to or greater than a threshold TH21, when the condition at S117 is satisfied, the process proceeds to S128. The threshold TH21 (ref. FIG. 10(*c*)) is set to a preferred value for distinguishing the adult from the child and the CRS, when the “lateral width 2” is equal to or greater than the threshold TH21, the detected subject strongly tends to the adult. Then, the CPU 21 adds a coefficient C13 to the determination value and updates the determination value as the current determination value at S128, and the process proceeds to S129. On one hand, when the CPU 21 determines that the “lateral width 2”is less than the threshold TH21 at S127, the process proceeds to S129.

Figure 8:
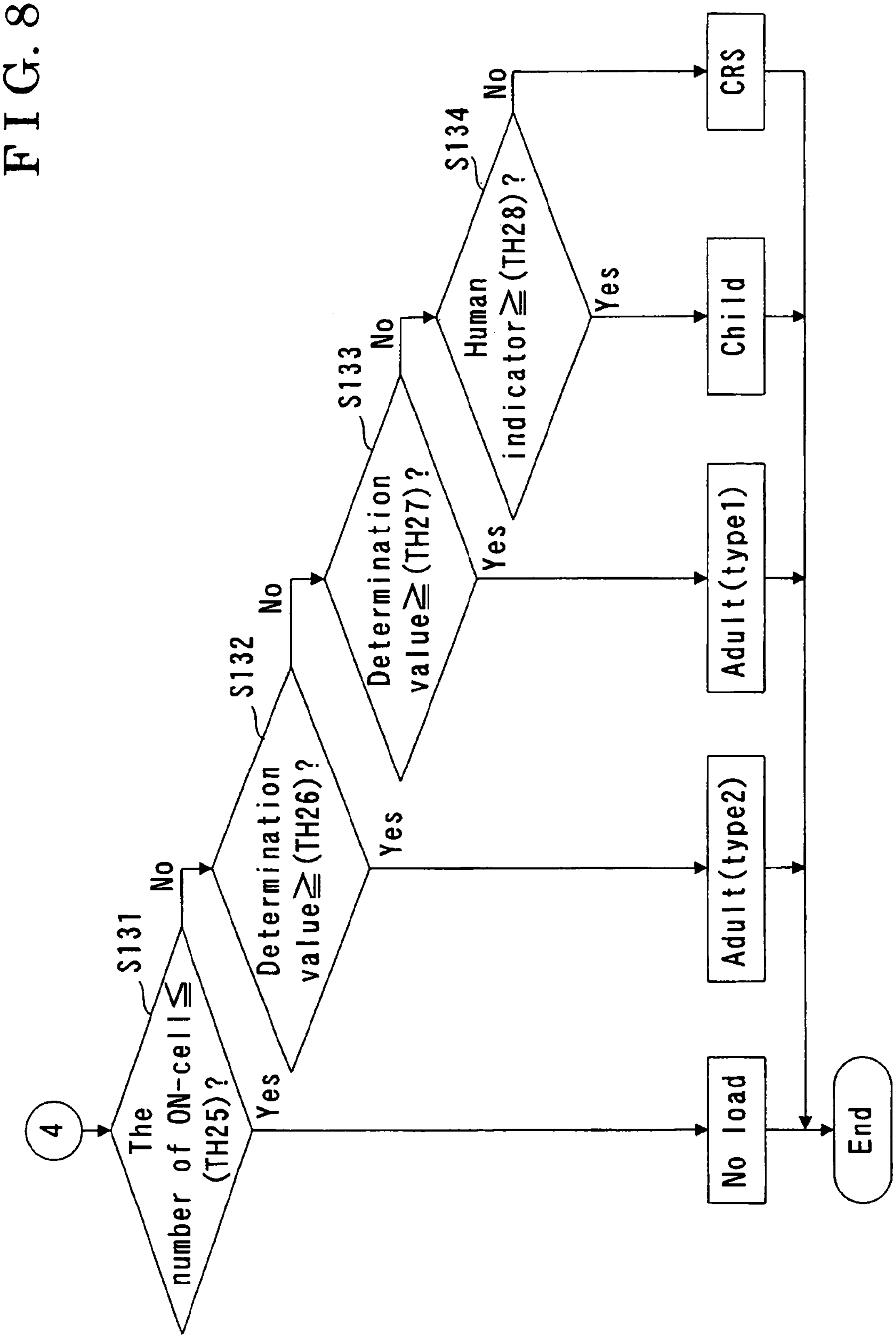
FIG. 8 is a flowchart for explaining the manner of determination process.

At S129, the CPU 21 determines whether the “lateral width” used for calculating the “aspect ratio” is equal to or less than a threshold TH22 and whether “the number of ON-cell” is greater than a threshold TH23 and less than a threshold TH24. When the condition at S129 is satisfied, the process proceeds to S130. The thresholds TH22 (ref. FIG. 10(*d*)), TH23 and TH24 (ref. FIG. 9(*b*)) are set to a preferred value for distinguishing the child, when the condition at S129 is satisfied, the detected subject strongly tends to the child. Then, the CPU 21 subtracts a coefficient C14 from the determination value and updates the determination value as the current determination value at S129, and the process proceeds to S131 (ref. FIG. 8). On one hand, when the condition at S129 is not satisfied, the process proceeds to S131. In addition, when the condition at S122 is not satisfied, in other words, when the determined subject strongly tends to except the adult, the process proceeds to S131 similarly.

As shown in FIG. 8, from S131, the CPU 21 determines whether the state on the seat corresponds to the adult, the child, the CRS, or no-load (nothing exists on the seat) based on the determination value calculated by the above-described process. First, the CPU 21 determines whether “the number of ON-cell” is equal to or less than a threshold TH25 at S131. The threshold TH25 (ref. FIG. 9(*b*)) is set to a preferred value for determining whether the seat is under load. When the condition at S131 is satisfied, the CPU 21 determines that the state on the seat corresponds to the no-load, and a routine of the determination process is ended. On one hand, when the CPU 21 determines that “the number of ON-call” is greater than the threshold TH25, the CPU 21 determines that any of the adult, the child, and the CRS exists on the seat, and the process proceeds to S132.

At S132, the CPU 21 determines whether the determination value is equal to or greater than a threshold TH26. The threshold TH26 (ref. FIG. 10(*e*)) is set to a preferred value for distinguishing the adult (type 2). When the determination value is equal to or greater than the threshold TH26, the CPU 21 determines that the determined subject corresponds to the adult (type 2), and the routine of the determination process is ended. On one hand, when CPU 21 determines that the determination value is less than the threshold TH26 at S132, the process proceeds to S133.

At S133, the CPU 21 determines whether the determination value is equal to or greater than a threshold TH27. The threshold TH27 (ref. FIG. 10(*e*)) is set to a preferred value for distinguishing the adult (type 1) from the child or the CRS, when the condition at S133 is satisfied, the CPU 21 determines that the determined subject corresponds to the adult (type 1), and the routine of the determination process is ended. On one hand, when the condition at S133 is not satisfied, the process proceeds to S134.

At S134, the CPU 21 determines whether the "human indicator" is equal to or greater than a threshold TH28. The threshold TH28 (ref. FIG. 9(*d*)) is set to a preferred value for distinguishing the child from the CRS with respect to the "human indicator", when the condition at S134 is satisfied, the CPU 21 determines that the determined subject corresponds to the child, and the routine of the determination process is ended. On one hand, when the condition at S134 is not satisfied, the CPU 21 determines that the determined subject corresponds to the CRS, and the routine of the determination process is ended.

As shown in the determination value in FIG. 10(*e*), since the coefficient is added to or subtracted from the determination value in response to various conditions, the CPU 21 can easily distinguish the adult, the child, and the CRS. Additionally, the CPU 21 can easily distinguish the CRS from the child by the "human indicator" shown in FIG. 9(*d*).

According to the embodiment, in the determination process, the "peak load" shown by the cells 13 of three rows including the "peak row" is applied. Generally, when the adult sits on the sitting part at the front side so as to deviate from the center of the sitting part, the pressure distribution is not properly detected by this deviation, and the state on the seat cannot be determined accurately. In this embodiment, since the determination is performed based on the "peak load" corresponding to concentrated load in the sitting part, the state on the seat can be determined in consideration of a position of the concentrated load, and then accuracy of the determination can be improved.

Further, the "lateral width 2" is applied to the determination process. In the calculation of the "lateral width 2", the width threshold NH corresponding to the regular sitting of the adult is applied, and the number of columns where the sum is greater than the width threshold NH is counted as the "lateral width 2". Thus, correlativity between the width threshold corresponding to the regular sitting of the adult and the actual sum appears as the number of counts, and the regular sitting of the adult can be determined. In addition, the width thresholds corresponding to the regular sitting of the child and the mounted CRS may be applied. Then, by counting the "lateral width 2" based on the comparison between these width thresholds and the sum at each column actually detected, the corresponding state on the seat (the child, the CRS) can be determined by correlativity between the two width thresholds and the "lateral width 2". Thus, accuracy of the determination can be improved.

Further, when the CPU 21 determines that the detected subject on the seat deviates leftward or rightward from the center of the sitting part based on the "right-and-left ratio", the width threshold is deviated in the width direction, the width threshold is set per columns corresponding to the deviation, and then the "lateral width 2" is counted. Thus, when the occupant sits on the sitting point so as to deviate in the width direction from the center, the "lateral width 2" is counted correspondingly, and the accuracy of the determination about the state on the seat can be improved. In addition, the "lateral width 2" is corrected by the correction coefficient of right and left ratio W2 based on the "right-and-left" ratio. Then, the lateral deviation can be followed, and the accuracy of the determination can be improved. Further, the CPU 21 determines whether the determined subject corresponds to the adult or the child based on the "lateral variation", and the "lateral width 2" is corrected by the correction coefficient of lateral width variation W3. Thus, the "lateral width 2" is counted so that the lateral variation with respect to the width direction can be applied to the determination, and the accuracy of the determination can be improved.

The "lateral edge" corresponding to a degree of load variation is applied to the determination process. According to the applicant's confirmation, when the adult sits on the seat, the load variation generally tends to modest, and when the child sits on the seat or the CRS is mounted on the seat, the load variation generally tends to sharp. Thus, the adult can be more accurately distinguished from the child based on the load variation in the width direction. That is, when the "lateral edge" has a low value, the determined subject corresponds to the adult, and when the "lateral edge" has a high value, the determined subject corresponds to the child, and then the accuracy of the determination can be improved.

Of course, an embodiment of the present invention is not limited to the above-described embodiment, and the following modification may be allowable.

In the embodiment, when the peak row and the "peak load" are detected, the sum of partial pressure is compared per three rows as predetermined number of rows. This number of rows used for comparing the sum is one of the examples, and any number of rows within the number of rows defined by all the cells 13 may be applied. However, the sum of partial pressure is compared per one row, the "peak row" and the "peak load" can be detected to be different from the actual condition. Thus, with reference to the pressure sensor 10 having the seven rows shown in the embodiment, the preferred number of rows is approximately three.

In the embodiment, though the peak row is located in the middle of three rows showing the "peak load", and the peak row may be located in the back-and-forth direction at both ends of three rows. Further, the plural peak rows may be applied.

In the embodiment, though the "right-and-left ratio" is calculated by three columns at each side with reference to the width direction, this number of columns is one of the examples, and any number of columns within the number of columns defined by all the cells 13 may be applied. However, with reference to the pressure sensor 10 having the ten columns shown in the embodiment, the preferred number of columns is approximately three.

In the embodiment, with reference to the calculation of the "right-and-left ratio", when the sum of the leftward three columns is greater than the sum of the rightward three columns, the "right-and-left ratio" is calculated by dividing the sum of the leftward three columns by the rightward three columns, and when the sum of the leftward three columns is less than the sum of the rightward three columns, the "right-and-left ratio" is calculated by dividing the sum of the rightward three columns by the leftward three columns. In this case, when the sum of the leftward three columns is greater than the sum of the rightward three columns, the "right-and-left ratio" may be calculated by dividing the sum of the rightward three columns by the leftward three columns, the CPU 21 can determines whether the determined subject deviates leftward or rightward from the center of the sitting part by changing the corresponding threshold. Further, with respect to the negative sign, the negative sign may be added to the "right-and-left ratio" as the sum of the leftward three columns is greater than the sum of the rightward three columns.

In the embodiment, though the "lateral variation" is used for correcting the "lateral width 2", the "lateral variation" may be used for determining the adult and the child. As shown in FIGS. 16(*a*) and (*b*), the characteristic of the child with respect to the width direction has a concave shape (shown by A1 and A2 in FIG. 16(*a*)), the characteristic of the adult has a convex shape (shown by A3 and A4 in FIG. 16(*b*)), and then the determined subject can be determined by using these characteristics.

When the width threshold is adjusted to the deviation with respect to the width direction (lateral deviation), the width threshold may be set to be moved by two cells relative to the normal width threshold. In this case, the number of cells to be moved is not limited. Further, in the width threshold, each threshold corresponding to each column may be corrected per column so that the deviation can be determined.

The principles, preferred embodiments and mode of operation of the present invention have been described in the foregoing specification. However, the invention which is intended to be protected is not to be construed as limited to the particular embodiments disclosed. Further, the embodiments described herein is to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claim is:

1. An occupant weight detecting device, comprising:

plural cells provided at a sitting part on a seat and detecting partial pressure which is defined by rows in a width direction of the sitting part and columns in a back-and-forth direction of the sitting part;

a peak row detecting means for calculating the sum of partial pressure per cells of plural number of rows adjoining in the back-and-forth direction and detecting any one row of the plural number of rows corresponding to the maximum sum to be defined as a peak row; and a detecting means for detecting a concentrated load position in the sitting part based on the peak row.

2. An occupant weight detecting device, comprising:

plural cells provided on a seat and detecting partial pressure which is defined by rows in a width direction of the seat and columns in a back-and-forth direction of the seat;

a peak row detecting means for calculating the sum of pressure per cells of plural number of rows adjoining in the back-and-forth direction and detecting any one row of the plural number of rows corresponding to the maximum sum to be defined as a peak row; and a deviation determining means for calculating the sum of the cells of plural number of columns from one end and the other end with respect to the width direction among the cells of plural number of rows including the peak row, the deviation detecting means for determining deviation of load with respect to the width direction on the seat based on the calculated sum.

3. An occupant weight detecting device, comprising:

plural cells provided on a seat and detecting pressure which is defined by rows in a width direction of the seat and columns in a back-and-forth direction of the seat;

a minimum column detecting means for detecting a minimum column in both sides with respect to the center of the width direction among the plural cells, in which the sum of pressure is minimum;

a variation calculating means for calculating a first difference between the sum at the minimum column and the sum at a second column adjoined by the minimum column toward the center of the width direction and a second difference between the sum at the second column and the sum at a third column adjoined by the second column toward the center of the width direction with respect to each minimum column detected by the minimum column detecting means, the variation calculating means for calculating variation at each side with respect to the width direction by comparing the first difference with the second difference; and a determination means for determining a state on the seat based on the variation at each side calculated by the variation calculating means.

4. An occupant weight detecting device, comprising:

plural cells provided on a seat and detecting pressure which is defined by rows in a width direction of the seat and columns in a back-and-forth direction of the seat;

a peak row detecting means for calculating the sum of pressure per cells of plural number of rows adjoining in the back-and-forth direction and detecting any one row of the plural number of rows corresponding to the maximum sum to be defined as a peak row;

a peak lateral width counting means for calculating the sum of pressure per each column in the cells of plural number of rows including the peak row, the peak lateral width counting means for comparing the sum at each column with a width threshold being set at each column, the peak width counting means for counting the number of columns in which the sum is greater than the width threshold to be defined as a peak lateral width; and a determination means for determining a state on the seat based on the peak lateral width counted by the peak lateral width detecting means.

5. An occupant weight detecting device, according to claim 4, further including a deviation determining means for calculating the sum of the cells of plural number of columns from one end and the other end with respect to the width direction among the cells of plural number of rows including the peak row, the deviation detecting means for determining deviation of load with respect to the width direction on the seat based on the calculated sum, wherein the peak lateral width counting means sets the width threshold per each column so as to correspond to the deviation of load based on the deviation of load with respect to the width direction determined by the deviation determining means and counts as the peak lateral width.

6. An occupant weight detecting device, according to claim 4, further including a minimum column detecting means for detecting a minimum column in both sides with respect to the center of the width direction among the plural cells, in which the sum of pressure is minimum, and a variation calculating means for calculating a first difference between the sum at the minimum column and the sum at a second column adjoined by the minimum column toward the center of the width direction and a second difference between the sum at the second column and the sum at a third column adjoined by the second column toward the center of the width direction with respect to each minimum column detected by the minimum column detecting means, the variation calculating means for calculating variation at each side with respect to the width direction by comparing the first difference with the second difference, wherein the peak lateral width counting means corrects the peak lateral width based on the variation calculated by the variation calculating means, and the determination means determines the state on the seat based on the corrected peak lateral width.

7. An occupant weight detecting device, comprising:

plural cells provided on a seat and detecting pressure which is defined by rows in a width direction of the seat and columns in a back-and-forth direction of the seat;

a peak row detecting means for calculating the sum of pressure per cells of plural number of rows adjoining in the back-and-forth direction and detecting any one row of the plural number of rows corresponding to the maximum sum to be defined as a peak row;

a difference calculating means for calculating the sum of pressure per each column in the cells of plural number of rows including the peak row, the difference detecting means for calculating difference per each column between the sum at a certain column and an adjoined column adjoined by the certain column in either direction when the sum at the adjoined column is greater than a predetermined threshold;

a lateral edge calculating means for summing the absolute value of all the difference at each column calculated by the difference calculating means and calculating a lateral edge calculated by comparing the sum of the absolute value of the difference with total load corresponding to the sum of pressure detected by all the plural cells; and a determination means for determining a state on the seat based on the lateral edge calculated by the lateral edge calculating means.

8. An occupant weight detecting device, according to claim 5, wherein the peak lateral width counting means sets the width threshold corresponding to the deviation of load per each column by moving the width threshold in the width direction based on the deviation of load with respect to the width direction determined by the deviation determining means.

* * * * *